United States Patent
Kaji et al.

(10) Patent No.: US 6,895,286 B2
(45) Date of Patent: May 17, 2005

(54) CONTROL SYSTEM OF OPTIMIZING THE FUNCTION OF MACHINE ASSEMBLY USING GA-FUZZY INFERENCE

(75) Inventors: Hirotaka Kaji, Shizuoka (JP); Masashi Yamaguchi, Shizuoka (JP); Hiroshi Harada, Shizuoka (JP); Yukio Matsushita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 476 days.

(21) Appl. No.: 09/727,424

(22) Filed: Dec. 1, 2000

(65) Prior Publication Data

US 2001/0044661 A1 Nov. 22, 2001

(30) Foreign Application Priority Data

Dec. 1, 1999 (JP) .......................................... 11-342261

(51) Int. Cl.[7] .......................... G05B 13/02; G06N 3/12
(52) U.S. Cl. .............................. 700/28; 700/47; 700/50; 706/8; 706/13
(58) Field of Search .............................. 706/8, 13, 3, 4; 700/28, 47, 50, 89, 169, 64, 9; 703/8

(56) References Cited

U.S. PATENT DOCUMENTS

| | | | | |
|---|---|---|---|---|
| 4,510,565 A | * | 4/1985 | Dummermuth ................. 700/7 |
| 4,760,275 A | * | 7/1988 | Sato et al. .................. 307/10.1 |
| 4,920,499 A | | 4/1990 | Skeirik | |
| 5,418,721 A | * | 5/1995 | Arai et al. ..................... 701/35 |
| 5,673,565 A | * | 10/1997 | Jeong et al. ..................... 62/80 |
| 5,774,630 A | * | 6/1998 | Lee et al. ....................... 706/3 |
| 5,796,077 A | * | 8/1998 | Jo .............................. 219/497 |
| 5,806,052 A | * | 9/1998 | Bonissone et al. ............. 706/4 |
| 5,857,321 A | * | 1/1999 | Rajamani et al. .......... 60/39.27 |
| 5,963,444 A | * | 10/1999 | Shidara et al. ................. 700/7 |
| 5,995,737 A | * | 11/1999 | Bonissone et al. ............. 703/8 |
| 6,004,015 A | * | 12/1999 | Watanabe et al. ............. 700/28 |
| 6,021,369 A | * | 2/2000 | Kamihira et al. ............ 701/102 |
| 6,038,505 A | * | 3/2000 | Probst et al. ................. 701/65 |
| 6,081,796 A | * | 6/2000 | Takagi et al. .................. 706/1 |
| 6,148,274 A | * | 11/2000 | Watanabe et al. ............. 703/6 |
| 6,278,986 B1 | * | 8/2001 | Kamihira et al. ............. 706/25 |
| 6,314,412 B1 | * | 11/2001 | Yamaguchi et al. .......... 706/13 |
| 6,397,113 B1 | * | 5/2002 | Kamihira ..................... 700/47 |
| 6,405,122 B1 | * | 6/2002 | Yamaguchi ................. 701/106 |
| 6,529,815 B2 | * | 3/2003 | Hawkins et al. ............ 701/104 |
| 6,529,816 B1 | * | 3/2003 | Yamaguchi et al. ........ 701/110 |
| 6,549,815 B1 | * | 4/2003 | Kaji ............................ 700/32 |
| 6,549,830 B2 | * | 4/2003 | Harada et al. ................ 701/21 |

FOREIGN PATENT DOCUMENTS

| | | |
|---|---|---|
| EP | 0 715 253 A2 | 6/1996 |
| EP | 0 957 416 A1 | 11/1999 |
| EP | 0 959 414 | 11/1999 |
| JP | 10-105202 | 4/1998 |

* cited by examiner

*Primary Examiner*—John Follansbee
*Assistant Examiner*—Aaron Perez-Daple
(74) *Attorney, Agent, or Firm*—Knobbe, Martens, Olson & Bear LLP

(57) ABSTRACT

The invention provides an optimization device for a unitary apparatus that can obtain optimum characteristics as a combined apparatus, without losing user's selectivity and unitary apparatus's versatility. The optimization device includes an optimization process section that optimizes dynamic characteristics of the unitary apparatus using genetic algorithms and fuzzy inference, with functional characteristics of a combined apparatus as evaluation reference.

22 Claims, 25 Drawing Sheets

FIG. 7

Fitness table

| Acceleration \ Speed | FAST | MID | SLOW |
|---|---|---|---|
| PL | | | |
| PS | | 0.42 | 0.28 |
| ZR | | 0.18 | 0.12 |
| NS | | | |
| NL | | | |

Add ↓

Total table

| Acceleration \ Speed | FAST | MID | SLOW |
|---|---|---|---|
| PL | 0.02 | 1.87 | 0.27 |
| PS | 4.96 | 8.39 | 3.72 |
| ZR | 12.61 ① | 86.42 | 35.48 ③ |
| NS | 9.55 | 49.75 ② | 22.37 ④ |
| NL | 8.96 | 18.19 | 2.44 |

FIG. 11

Evolutionary computation module (GA)

Evolutionary computation module (ES)

CONTROL SYSTEM OF OPTIMIZING THE FUNCTION OF MACHINE ASSEMBLY USING GA-FUZZY INFERENCE

BACKGROUND OF THE INVENTION

1. Field of the Invention

The invention relates to an optimization device for optimizing dynamic characteristics of a unit device (unitary apparatus) integrated in a machine assembly (combined apparatus) that comprises plural unit devices. The unit device may be a replaceable unit.

2. Description of the Related Art

In the past, there are products that are used as complete products by combining a plurality of apparatuses (called the "combined apparatuses" hereunder). Many combined apparatuses are controlled by control devices, where dynamic characteristics of at least one unitary apparatus are appropriate. The examples for this case are a motor boat used by combining an outboard motor and a hull, and an air conditioner used by combining an outdoor machine and an indoor machine.

The characteristics of a control module for a unitary apparatus (that is, parameter values that determine the relationship between input and output of the control module) used for combined apparatuses are decided by combining apparatuses. When characteristics of combined apparatuses and use environment can be found beforehand, the characteristics of control modules are designed adjustably with respect to combining apparatuses so that they can be determined in a design stage or in a setting stage before shipment.

When apparatuses to be combined cannot be identified beforehand because of several types of apparatuses that can be combined, or when combined apparatuses are used in changing environment, the characteristics of control modules are determined, supposing the apparatuses to be combined and the environment, in order that they can be met as much as possible.

Moreover, there are proposed a fuzzy inference for optimizing characteristics of a fuzzy controller in response to fluctuations of supposed use environment and user's characteristics, and a method of optimizing characteristics of a fuzzy controller in real time by using a neural network or heuristic rule.

SUMMARY OF THE INVENTION

However, when the characteristics of a control module for a unitary apparatus used for combined apparatuses are determined in a design stage, apparatuses to be combined with the unitary apparatus are totally fixed. Therefore, that produces a problem that a user cannot select apparatuses to be combined with a unitary apparatus, and that there is no versatility with a unitary apparatus itself. Even if the characteristics of a control module for a unitary apparatus can be adjusted, when the adjustable range is fixed to specific apparatuses, versatility is lost and user's selectivity is lost, too.

When the characteristics of a control module is decided, supposing the apparatuses to be combined and use environment so that they can be met, adaptability tends to get lower toward each of the apparatuses to be combined and use environment. As a result, there is a problem that optimum control cannot be achieved.

One of the objects of one embodiment of the invention is, by solving the problems mentioned above, to provide an optimization device of a unitary apparatus for combined apparatuses that can obtain optimum characteristics, without losing user's selectivity and versatility of a unitary apparatus.

One aspect of the invention is directed to an optimization apparatus for optimizing an operation characteristic of a unitary apparatus that can be used as a combined apparatus by combining other apparatuses. The optimization apparatus comprises an optimization process device for, in real time, optimizing the operation characteristic of the unitary apparatus, with a functional characteristic of the combined apparatus as an evaluation criterion.

Preferably, the optimization apparatus further comprises a basic control module for deciding a manipulated variable of the unitary apparatus based on predetermined input information, whereby the optimization process device optimizes control parameters of the basic control module with a control characteristic of the combined apparatus as an evaluation criterion.

Advantageously, in addition to the above, the optimization apparatus further comprises a compensation control module for deciding compensation quantity or compensation ratio of the manipulated variable based on predetermined input information, whereby the optimization process device optimizes control parameters of the compensation control module with the control characteristic of the combined apparatus as an evaluation criterion.

Another aspect of the present invention is a method for optimizing in real-time operation of a machine assembly manipulated by a user, said machine assembly comprising plural replaceable devices, each device being operated by a control module, the input-output relationship of which control module is regulated by control parameters, said method comprising the steps of: (a) operating the replaceable devices using control modules; (b) optimizing in real-time the input-output relationship of at least one control module by coding into templates parameters fully or partially regulating the control module, said templates being subjected to heuristic processing, wherein at least one fitted set of parameters is selected by evaluating output of the machine assembly based on the user's ultimate choice or a preselected target; and (c) operating the machine assembly using the optimized control module.

This optimization method can be applied to various machines including replaceable component devices, whereby unstandarized devices which cannot conventionally be installed can be used.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description of the preferred embodiments which follow.

BRIEF DESCRIPTION OF THE DRAWINGS

These and other features of this invention will now be described with reference to the drawings of preferred embodiments which are intended to illustrate and not to limit the invention.

FIG. 7 illustrates relationship between a fuzzy control table of a boat operation fuzzy control module and individuals produced by encoding part of it.

FIG. 11 illustrates one example of seeking a total of fitness of fuzzy rules.

DETAILED DESCRIPTION OF THE PREFERRED EMBODIMENT

Some embodiments of an optimization device of a unitary apparatus for a combined apparatus (called the "optimization device" hereunder) in accordance with the invention will be explained, referring to the figures below. The unitary apparatus may also be referred to as a replaceable device or replaceable component device. The combined apparatus may also be referred to as a machine assembly.

Figure 1A:
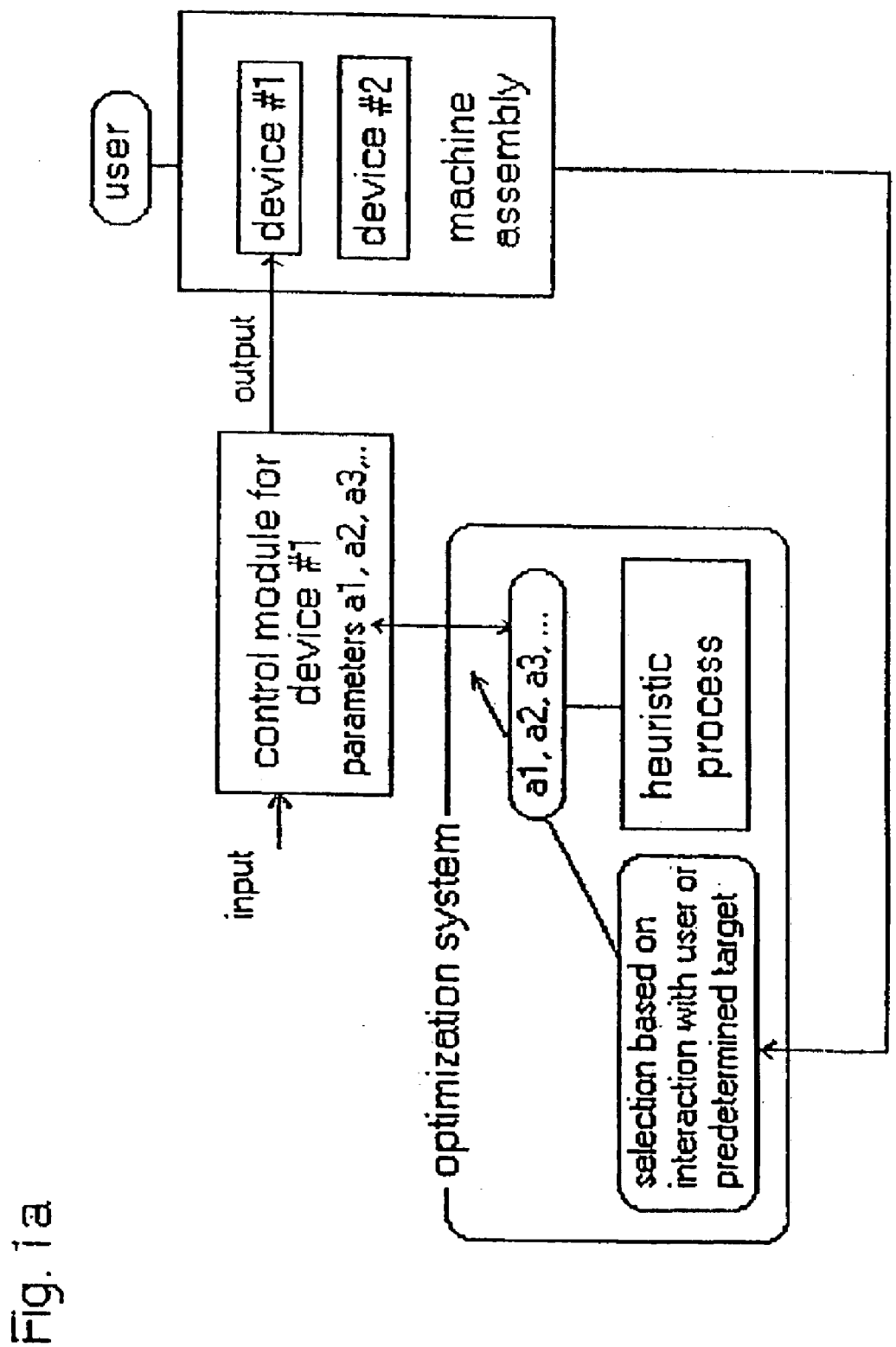
FIGS. 1a, 1b, 1c, and 1d are schematic diagrams illustrating embodiments of the control system of the present invention.

An aspect of the present invention is a method for optimizing in real-time operation of a machine assembly manipulated by a user. The machine assembly comprises plural replaceable devices, each device being operated by a control module. The input-output relationship of the control module is regulated by control parameters. FIG. 1a is a schematic diagram illustrating one embodiment of the optimization system. In this system, the following steps are conducted: (a) operating replaceable devices (devices #1, #2) using control modules; (b) optimizing in real-time the input-output relationship of at least one control module (the control module for device #1) by coding into templates parameters (a1, a2, a3, . . . ) fully or partially regulating the control module, said templates being subjected to heuristic processing, wherein at least one fitted set of parameters is selected by evaluating output of the machine assembly based on the user's ultimate choice or a preselected target; and (c) operating the machine assembly using the optimized control module.

Figure 1B:
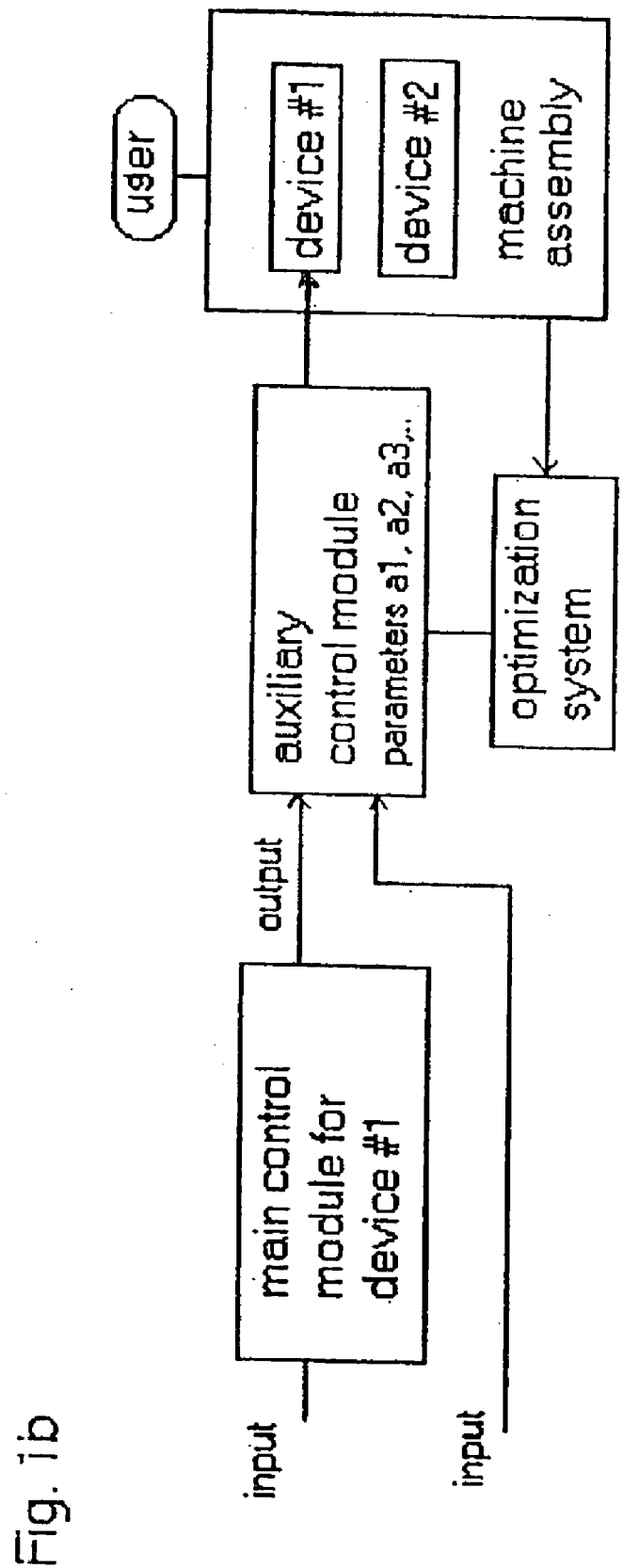
Figure 1C:
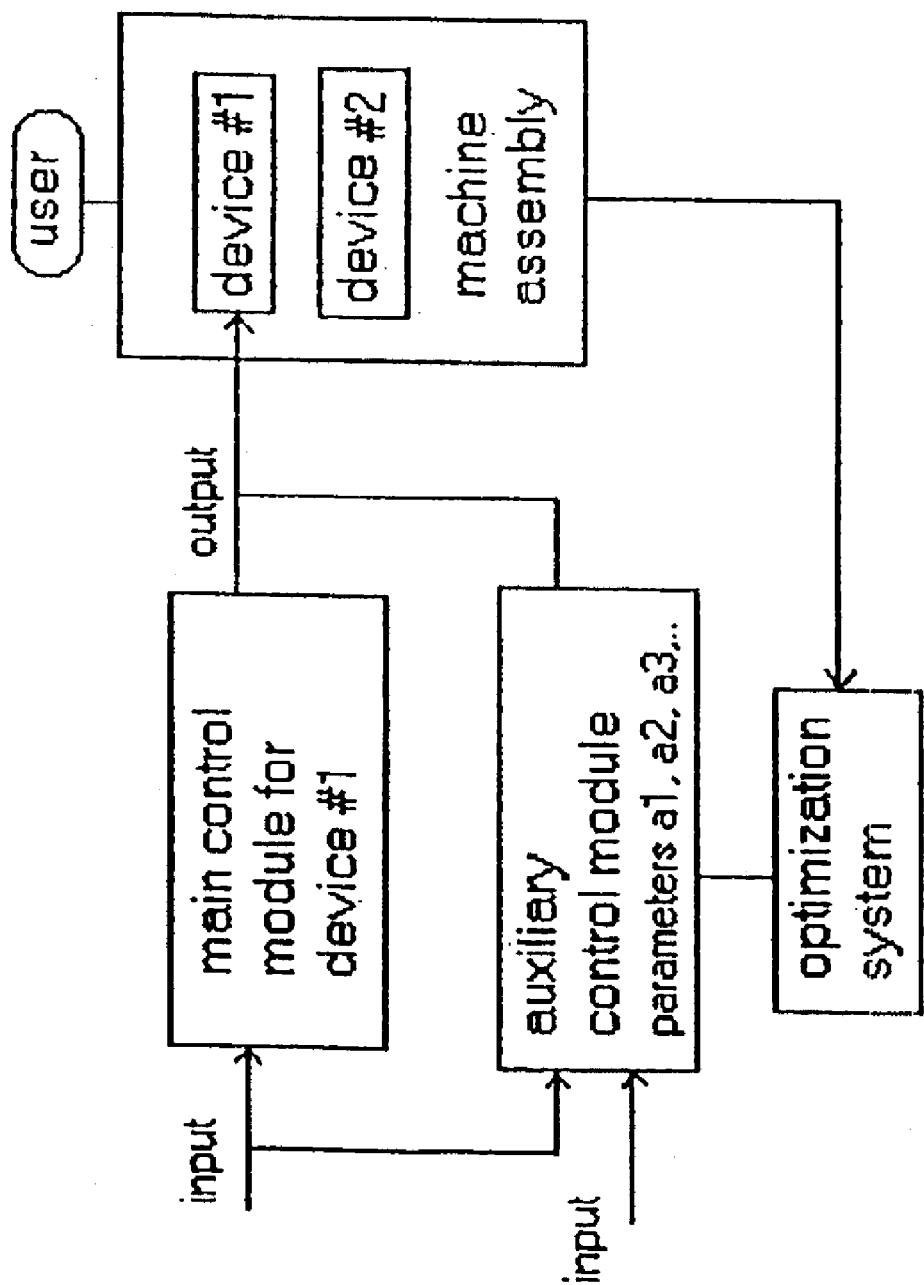

FIGS. 1b and 1c illustrate other embodiments of the optimization system, wherein the control module comprises a main control module and an auxiliary control module, and step (b) is conducted on the auxiliary control module. In FIG. 1b, the main control module and the auxiliary control module are arranged in series. In FIG. 1c, the main control module and the auxiliary control module are arranged in parallel.

Figure 1D:
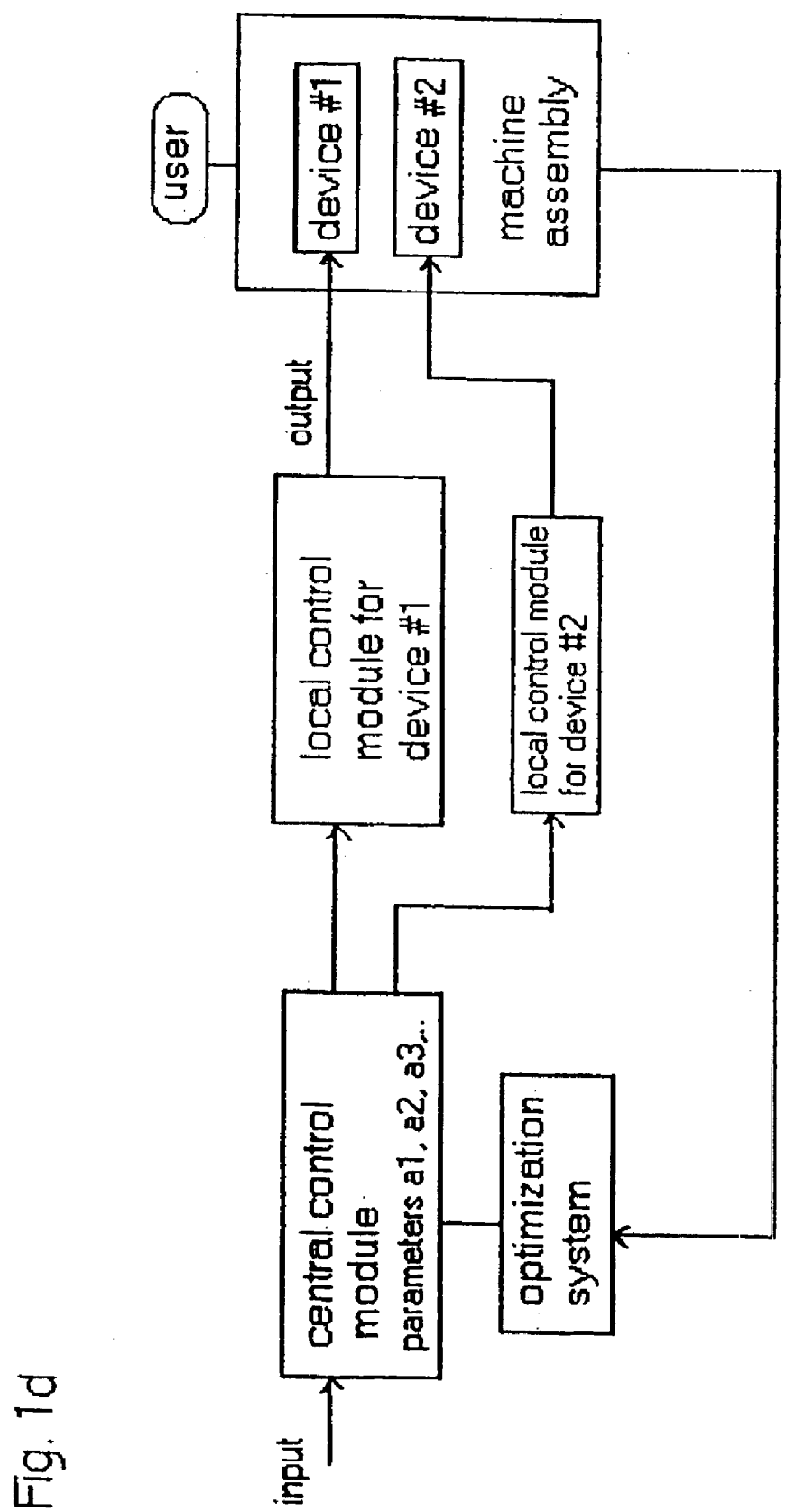

FIG. 1d illustrates another embodiment, wherein the control module comprises a central control module and a local control module, and step (b) is conducted on the central control module.

In the above, the heuristic processing may be evolutionary computation, and the templates are chromosomes.

Figure 1E:
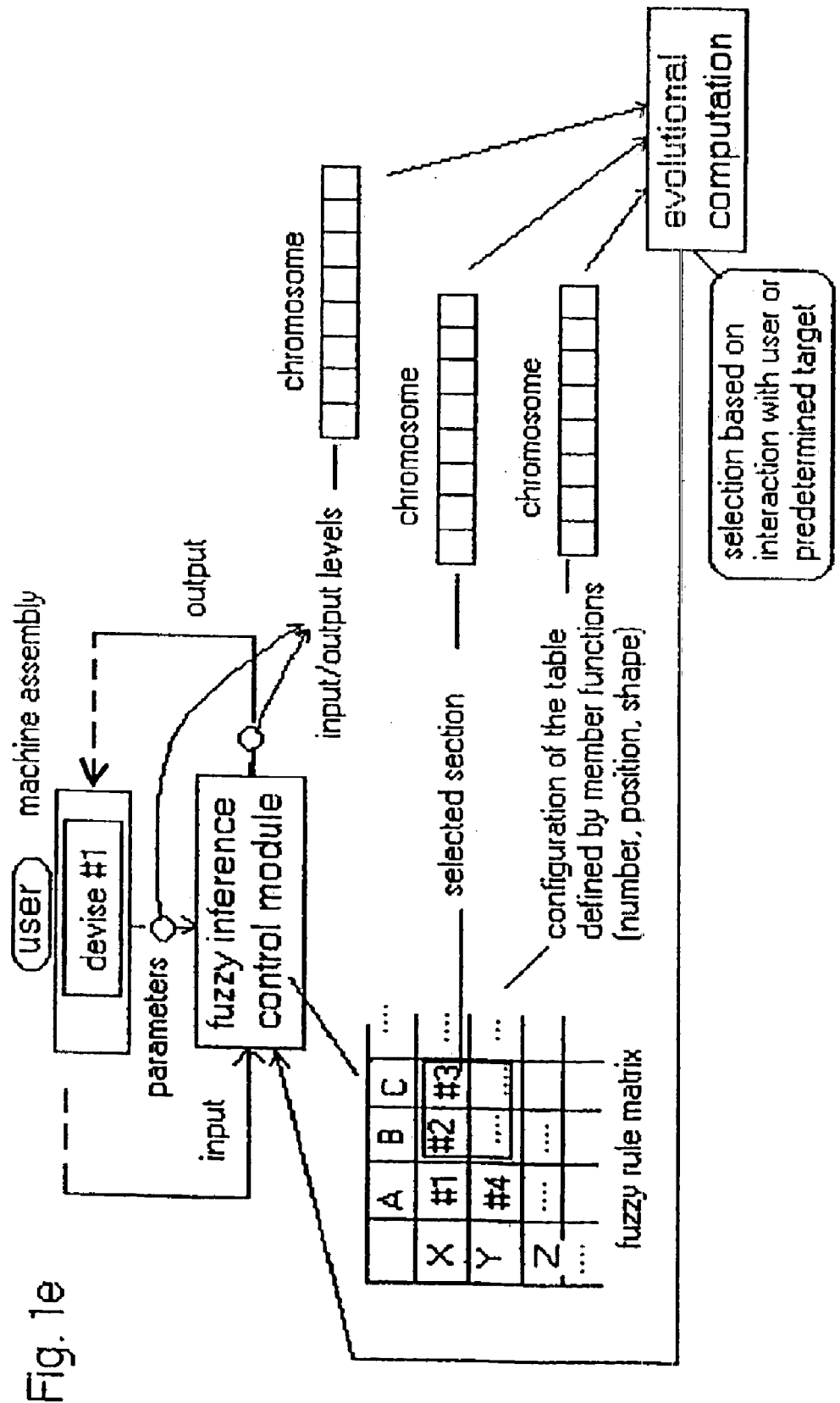
FIG. 1e is a schematic diagram illustrating one embodiment of a fuzzy inference control module.

When controlling complex devices or unstandarized devices, a fuzzy inference system is useful. FIG. 1e is a schematic diagram illustrating one embodiment of a fuzzy inference control module, wherein the control module regulated by control parameters is provided with a fuzzy inference system comprising a matrix of fuzzy rules which are regulated by preselected parameters, and the optimization step is conducted by at least one of the following: (i) revising the fuzzy rule matrix by extracting a section from the matrix and coding elements of the section into chromosomes; (ii) modifying the configuration of the fuzzy rule matrix defined by membership functions by coding elements of the membership functions into chromosomes; or (iii) changing a level of an input of the parameters and a level of an output of the fuzzy inference system by coding elements of the levels into chromosomes.

In the above, the method may further comprise monitoring the fuzzy rule matrix in use while operating the machine, and evaluating the section extracted in (ii) or the membership functions to be modified in (iii).

In the above, the parameters may be (i) the number, shape, position and/or expanse of membership functions for the fuzzy inference system of the control device, (ii) fuzzy rules, or (iii) standardized coefficients for input and output values. The fuzzy rules can be compiled in the form of a fuzzy rule matrix. The configuration of the matrix may be defined by membership functions. Each section of the matrix represents a fuzzy rule which is a parameter having a value. The type of parameter and a value of the parameter are referred to as "a parameter".

Coding into chromosomes or templates can be made on all of the parameters or part thereof selected for the fuzzy controller.

In the present invention, correlations between various inputs and various outputs of the control modules can be determined using existing techniques such as neural networks, fuzzy neural networks, and genetic algorithms if the correlations are highly complex, or using existing techniques such as maps and functional equations if the correlations are rather simple. In this regard, Da Ruan (editor) "Intelligent Hybrid Systems—Fuzzy Logic, Neural Networks, and Genetic Algorithms—" Kluwer Academic Publishers (1997), J.-S. R. Jang, C.-T. Sun, E. Mizutani, "Neuro-Fuzzy and Soft Computing" Prentice Hall Upper Saddle River, N.J. 07458 (1997), C.-T. Lin and C. S. George Lee, "Neural Fuzzy Systems" Prentice Hall Upper Saddle River, N.J. 07458 (1998), and N. K. Kasabov, "Foundations of Neural Networks, Fuzzy Systems, and Knowledge Engineering" the MIT Press (1996) are hereby incorporated by reference. The above techniques can be combined, and learning control can be adapted for any techniques.

Further, in addition to genetic algorithms (GA), genetic programming (GP) or other evolutionary computing techniques can be adapted to the present invention (Wolfgang Banzhaf, et al. (editor), "Genetic Programming, An Introduction", pp. 363–377, 1999, Morgan Kaufmann Publishers, Inc., for example). These techniques are sometimes categorized as "heuristic control" which includes evolution, simulated annealing, and reinforcement learning method (S. Suzuki, et al., "Vision-Based Learning for Real Robot: Towards RoboCup", RoboCup-97 Workshop, 23, 24, and 29 Aug., 1997 Nagoya Congress Center, pp. 107–110; K. and Nurmela, et al., "Constructing Covering Designs By Simulated Annealing", pp. 4–7, Helsinki University of Technology, Digital Systems Laboratory, Technical Reports No. 10, January 1993, for example). These techniques can be adapted to the present invention without complication, based on the principle described earlier.

Further, the heuristic control includes a multi-agent system which is used for competitive co-evolution (Tamashiro, et al., "Study about the performance of competitive co-evolution in multi-agent system", Technical Report of the Institute of Electronics, Information and Communication Engineers, NS99-16 (1999-06), pp. 37–41).

Several embodiments of the present invention will be explained with reference to the drawings.

Figure 2:
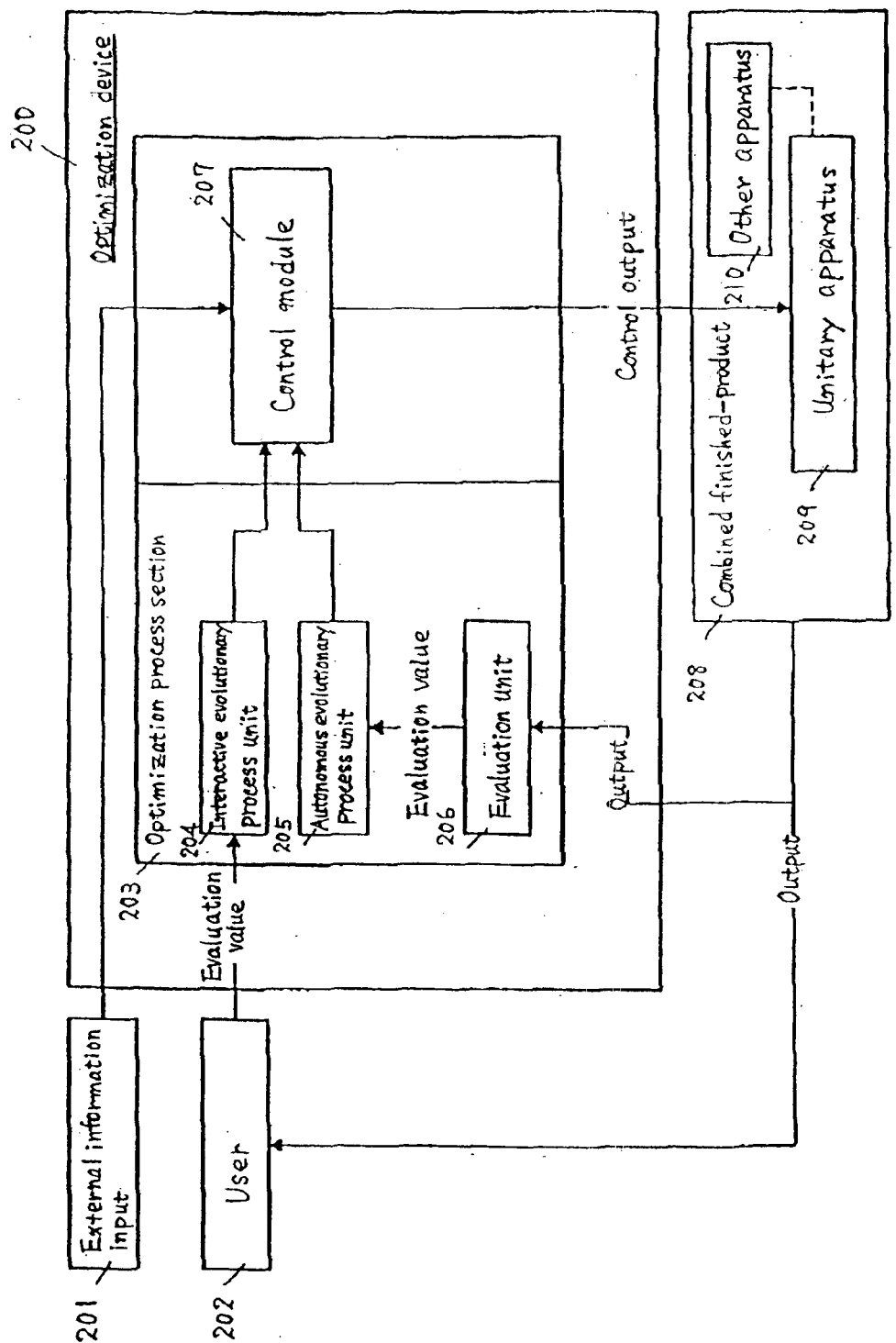
FIG. 2 is a block diagram illustrating one embodiment of an optimization device of a unitary apparatus for a combined apparatus in accordance with the invention.

FIG. 2 is a block diagram illustrating one embodiment of an optimization device in accordance with the invention. An optimization device 200 receives external information 201 as input information. The optimization device 200 includes a control module 207 that, based on the input information, decides and outputs information related to a manipulated variable, compensated amount, or manipulated variable for a compensation coefficient, toward a unitary apparatus 209 constituting a combined apparatus 208 together with another apparatus 210. The control module 207 is, preferably, the one that employs a fuzzy inference system, for example, a fuzzy controller, fuzzy intention determination system, or fuzzy neurocontroller. But, the control module 207 is not limited to these.

The optimization device 200 includes an optimization process section 203 that has an interactive evolutionary process unit 204 and an autonomous evolutionary process unit 205. These process units 204 and 205 optimize parameters of the control module 207 during use of the combined apparatus 208, i.e., in real time, using characteristics of the combined apparatus 208 as evaluation reference.

The parameters to be optimized can be any type of parameter as long as they are related to the control module. For example, when a fuzzy inference system is employed, cited as such are the parameters for deciding the number, shape, position and expanse of a membership function, the fuzzy rules, and the standardized coefficients for input and output values.

With regard to evaluation for optimization, the interactive evolutionary process unit 204 receives evaluation values applied by the user 202, and the autonomous evolutionary process unit 205 accepts evaluation values from the evaluation unit 206 which is designed beforehand based on predetermined evaluation criteria.

By, in real time, optimizing parameters of the control module that controls the unitary apparatus, using characteristics of the combined apparatus as evaluation reference, the unitary apparatus can be optimized to fit any arbitrary apparatus and use environment. As a result, the unitary apparatus can be optimized, keeping versatility of the unitary apparatus and probability of selection of other apparatuses.

Next, some embodiments where the optimization method in accordance with the invention is applied to a controlled system will be explained below. FIGS. 3–18 show embodiments where the optimization method is applied to an outboard motor and a trimming apparatus for a planing boat.

Figure 3:
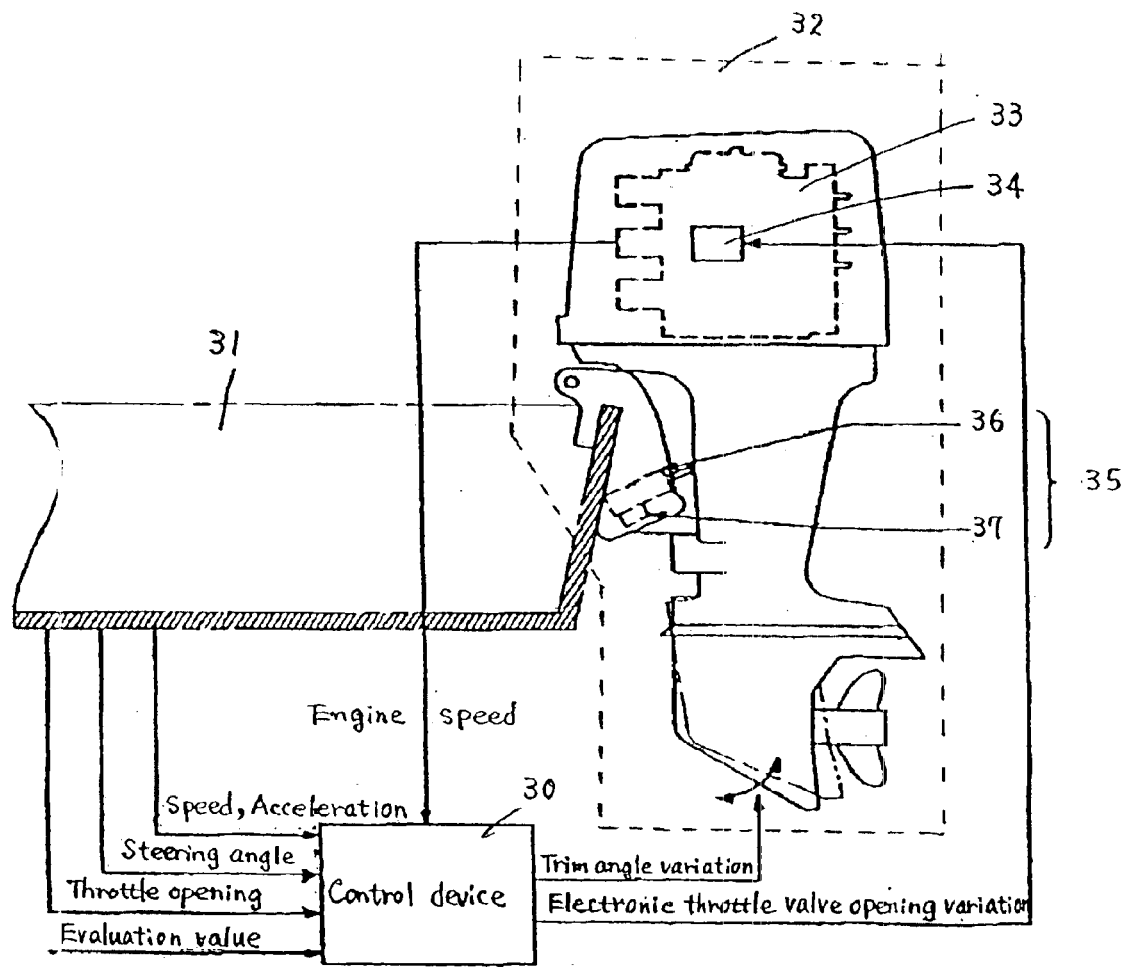
FIG. 3 is a figure illustrating a control device and an outboard motor including a trimming apparatus.

FIG. 3 is a figure illustrating a control device and an outboard motor including a trimming apparatus. An outboard motor 32 is mounted to a hull 31. The outboard motor 32 includes an engine 33 for operating the hull 31 and a trimming apparatus 35 for controlling the cruising direction of the hull 31. The engine 33 has an electronic throttle valve 34 for controlling the speed thereof. The trimming apparatus 35 contains a hydraulic cylinder 36 and a hydraulic pump 37. The outboard motor 32 is connected to an control device 30.

The control device 30 optimizes boat operation characteristics and acceleration characteristics which realize a constant speed navigation control and acceleration optimization control in response to changes in the movement of the hull 31 and disturbances. The control device 30 also optimizes the boat operation characteristics and acceleration characteristics, by responding to preferences of users-when the users are different, or when the preferences of even one and the same user vary dependent on time, for example, when his preferences vary in spring or fall. The "boat operation characteristics" herein mean boat speed control characteristics by the operations of the electronic throttle valve 34 and the trimming apparatus 35.

The control device 30 inputs the engine speed, the speed, acceleration, steering angle, and throttle opening of the hull 31, and the evaluation value. The control device 30 outputs an electronic throttle valve opening variation and a trim angle variation to operate the electronic throttle valve 34 and the trimming apparatus 35, respectively, which controls intake of air and posture of the hull for constant speed navigation control and acceleration optimization control.

Figure 4:
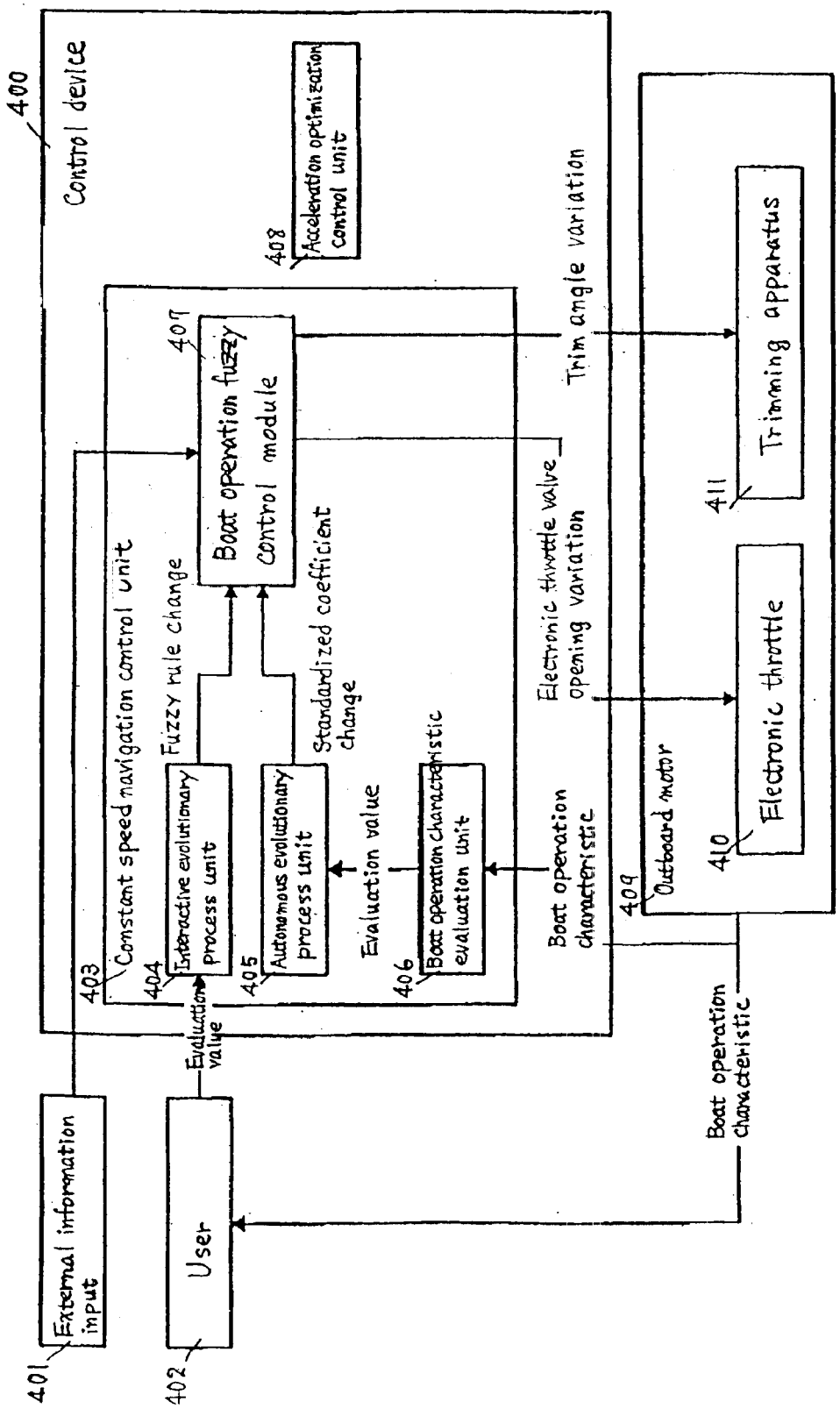
FIG. 4 is a block diagram illustrating an inner structure of a control device.

FIG. 4 is a block diagram illustrating an inner structure of a control device 400. The control device 400 includes a constant speed navigation control section 403, and an acceleration optimization control unit 408. In FIG. 4, a structure with respect to the constant speed navigation control section 403 is shown (a structure with respect to the acceleration optimization control unit 408 is shown as an acceleration optimization control section 504 in FIG. 5). The constant navigation control section 403 has a boat operation fuzzy control module 407, an autonomous evolutionary process unit 405, a boat-operation characteristic evaluation unit 406, and an interactive evolutionary process unit 404. The boat operation fuzzy control module 407 determines an opening of an electronic throttle valve for an electronic throttle 410 and a trim angle for a trimming apparatus 411 in response to predetermined input information. The autonomous evolutionary process unit 405 optimizes standardized coefficients of the boat operation fuzzy control module 407. The boat-operation characteristic evaluation unit 406 evaluates the autonomous evolutionary process unit 405. The interactive evolutionary process unit 404 optimizes the fuzzy rules of the boat operation fuzzy control module 407.

Figure 5:
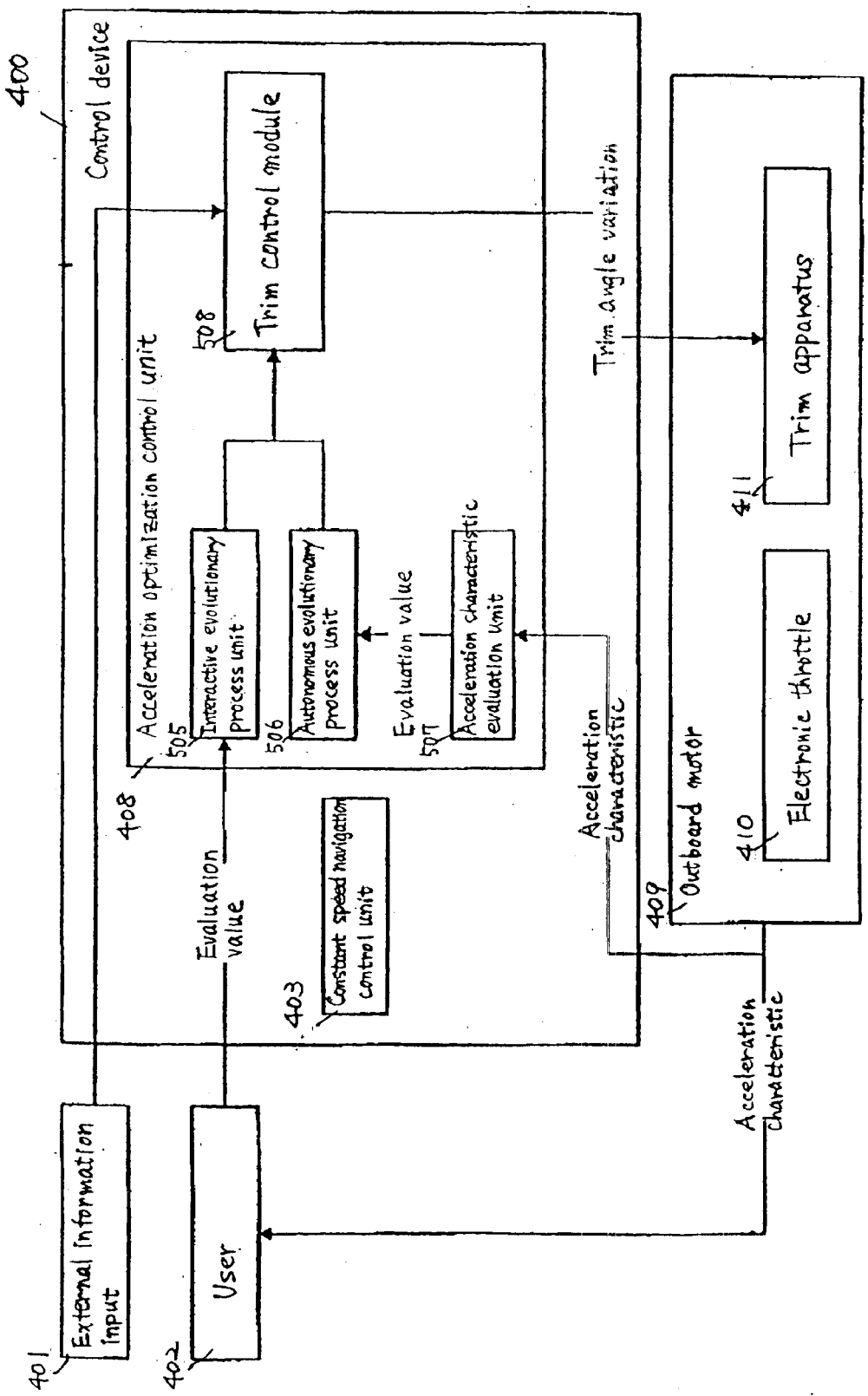
FIG. 5 is a block diagram illustrating an inner structure of a control device.

FIG. 5 is a block diagram illustrating an inner structure of a control device 400 with respect to the acceleration optimization control unit 408. The structure with respect to the constant speed navigation control unit 403 is shown in FIG. 4. The acceleration optimization control unit 408 includes a trim control module 508, an autonomous evolutionary process unit 506, an acceleration characteristic evaluation unit 507, and an interactive evolutionary process unit 505. The trim control module 508 determines a trim angle for the trim apparatus 411 in response to predetermined input information. The autonomous evolutionary process unit 506 optimizes control parameters of the trim control module 508. The acceleration characteristic evaluation unit 507 evaluates the autonomous evolutionary process unit 506. The interactive evolutionary process unit 505 optimizes control parameters of the trim control module 508.

The "standardized coefficients" mean coefficients that adjust amount of input and output information.

1. Control by a Constant Speed Navigation Control Unit

The boat operation fuzzy control module employs a simplified inference method as a fuzzy inference system, and outputs an electronic throttle valve opening variation and a trim angle variation in response to the engine speed, speed, acceleration, and steering angle. A fuzzy rule table can be designed based on the boat operation knowledge of the skilled. The fuzzy rule is expressed by real number values.

Figure 6:
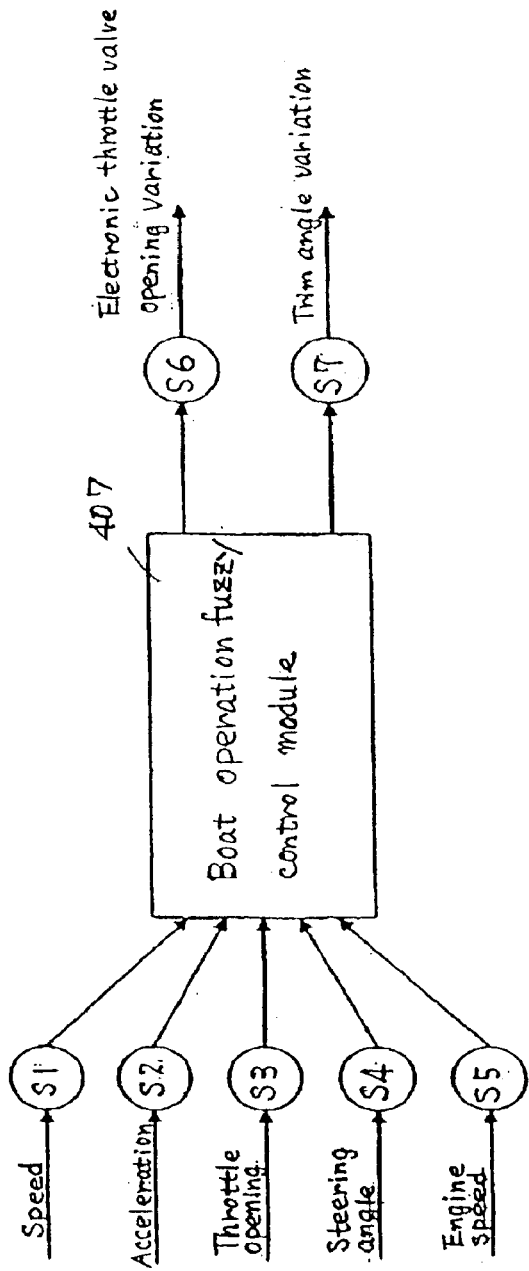
FIG. 6 illustrates relationship between standardized coefficients of a boat operation fuzzy control module and individuals produced by encoding them.

FIG. 6 illustrates relationship between standardized coefficients of the boat operation fuzzy control module 407 and individuals produced by encoding them. The speed is applied to standard coefficient S1; the acceleration, S2; the throttle opening, S3; the steering angle, S4; and the engine speed, S5. Each of the information is applied to the boat operation fuzzy control module 407 through its corresponding standard coefficient. The boat-operation fuzzy control module 407 outputs the electronic throttle valve opening variation and the trim angle variation through the corresponding standard coefficient S6 and S7, respectively.

The autonomous evolutionary process unit in the constant speed navigation control unit uses a genetic algorithm, and encodes the standardized coefficients of the boat operation fuzzy control module 407 -as shown in FIG. 6 to produce individuals. In FIG. 6, inputs from the interactive evolutionary process unit 404 and the autonomous evolutionary process unit 405 are not shown (see FIG. 4). The autonomous evolutionary process unit optimizes the standardized coefficients by using the genetic algorithm. With regard to evaluation of each individual during autonomous evolutionary process, regarding boat operating characteristics, higher evaluation values are provided by the evaluation unit as an error between an actual speed and a reference a user has fixed gets closer to a desired range. As a result, the standardized coefficients of the boat operation fuzzy control module 407 are automatically optimized towards the desired boat operating characteristics, and an optimal boat operating characteristic is obtained even when the use environment changes or the hull moves inappropriately.

Thus, the method, by which the evaluation in evolutionary process is made by the evaluation unit designed beforehand and the optimization is automatically performed, is called autonomous evaluation herein.

Figure 7:
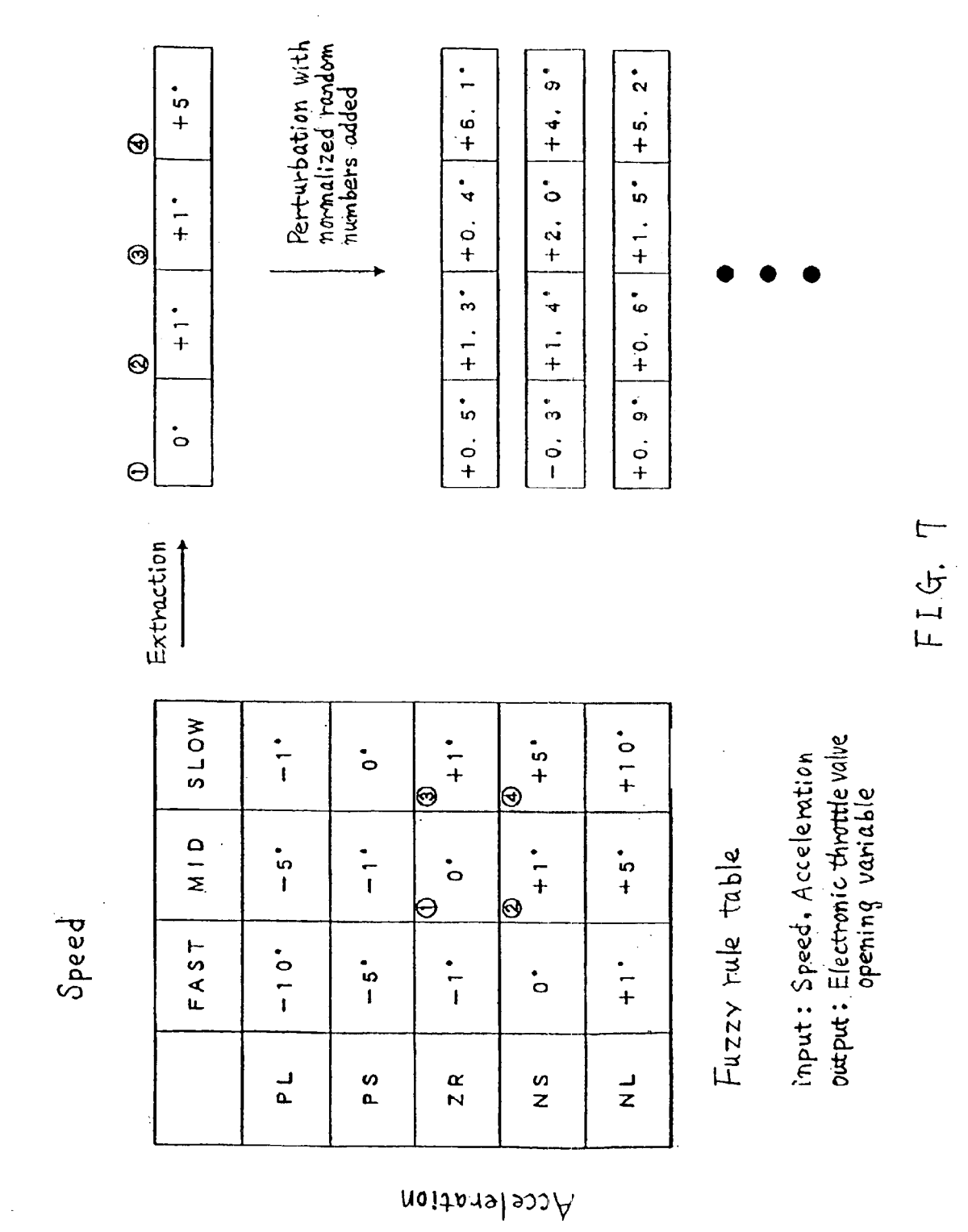

FIG. 7 illustrates relationship between a fuzzy rule table of the boat operation fuzzy control module and individuals produced by encoding part of it. The interactive evolutionary process unit uses a genetic algorithm, by which part of the fuzzy rule table for the boat operation fuzzy control module is encoded to produce the individuals, and optimizes the part of the fuzzy rule table using the genetic algorithm. The evaluation of each of the individuals during the interactive evolutionary process is done based on the comfortableness of the ride the user experiences. As a result, the part of the fuzzy rule table is optimized based on the evaluation of the user to produce an optimal boat operating characteristic suitable for the user's evaluation.

The method the user employs regarding the evaluation in evolutionary process is called interactive evaluation herein. The evolutionary process in the constant-speed navigation control unit will be explained below.

Figure 8:
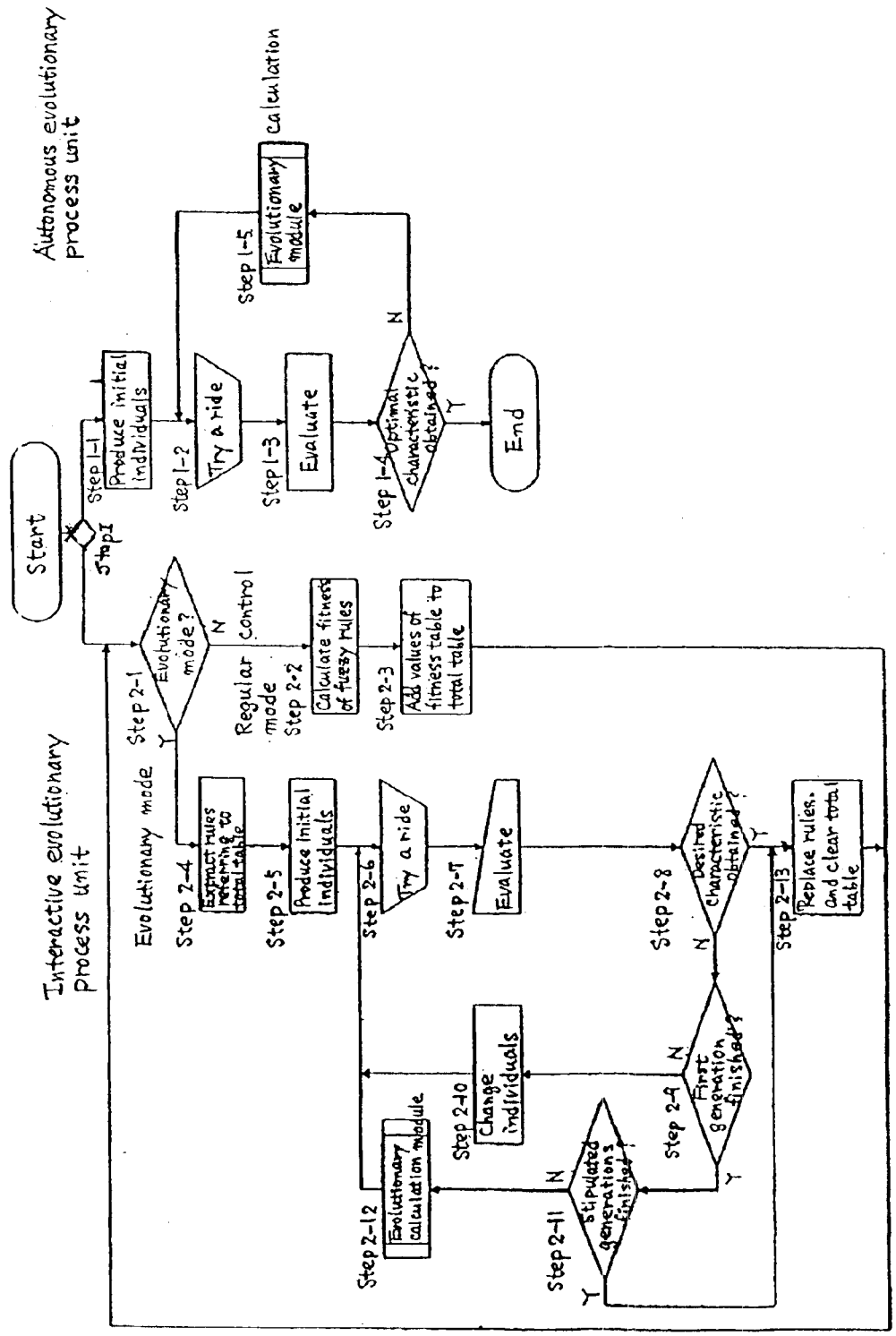
FIG. 8 is a flowchart illustrating evolutionary process by a constant-speed navigation control unit.

FIG. 8 is a flowchart illustrating evolutionary process by a constant-speed navigation control unit. The constant speed navigation control unit, in doing evolutionary process, performs an autonomous evaluation by the autonomous evolutionary process unit and an interactive evaluation by the interactive evolutionary process unit.

When evaluation methods are different, the flows of optimal process will be different. Accordingly, an evolutionary process adopting an autonomous evaluation method and an evolutionary process employing an interactive autonomous evaluation method are explained individually.

a. Evolutionary Process in an Autonomous Evolutionary Process Unit

As shown in FIG. 8, initial values of the standardized coefficients are determined at random within a range decided beforehand to produce first generation comprising a plurality of initial individuals (step 1-1). A constant speed navigation evaluation on all the individuals in the first generation is performed (step 1-2). The constant speed navigation evaluation is explained here. A plurality of individuals is operated in parallel by time division and evaluation values are compared by a total of the duration. To be specific, evaluation is changed according to a range of engine speed used.

Figure 9:
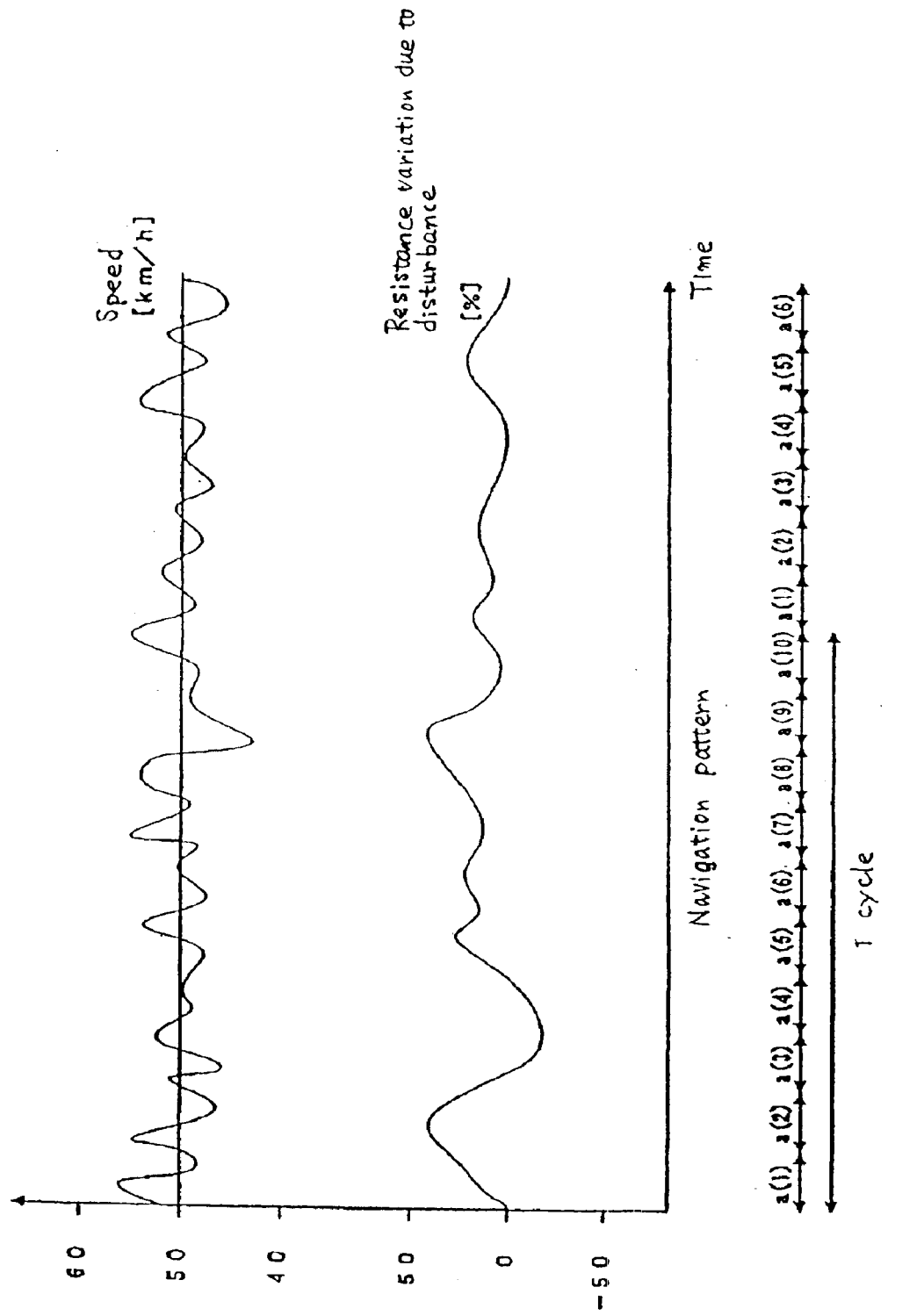
FIG. 9 is a graph illustrating one example of performing time division when a plurality of individuals is evaluated by time-division.

FIG. 9 is a graph illustrating one example of performing time division when a plurality of individuals is evaluated by time-division. As shown in the figure, in the case of trolling where a low speed of an engine is used, ten individuals are controlled every minute, and absolute values of the difference between a reference and an actual speed are totaled every sampling time. Making this one cycle, twenty cycles are repeated to calculate a total within an evaluation period as an evaluation value. By doing so, since influence by disturbances such as atmospheric phenomena and oceanic phenomena (for example, wind, or wave) is understood as a total through the individuals, a fair evaluation of characteristics of each individual can be made.

In the case of cruising where a high speed of an engine is used, unstable movements are produced such as pitching that moves a hull upward or downward and Dutch roll that moves a hull in leftward or rightward. When pitching or Dutch roll is detected by sensors, zero is given as an individual evaluation value and a trim angle is reduced till pitching or Dutch roll is prevented from producing, which leads to the hull being stable. The trim angle at that time is called a maximum trim angle. Each individual is evaluated based on the maximum trim angle, which can prevent unstable movements from generating at a high speed.

Based on the evaluation value of each individual derived by the evaluation value calculation method, it is evaluated whether the evaluation value is an optimal boat operation characteristic (step 1-3). As a result of the evaluation, it is decided whether an optimal boat operation characteristic is obtained (step 1-4). If the optimal boat operation characteristic is obtained, the evolutionary process is finished. If not, the process proceeds to an evolutionary calculation module to generate individuals of the next generation (step 1-5).

b. Evolutionary Process in an Interactive Evolutionary Process Unit

Figure 10:
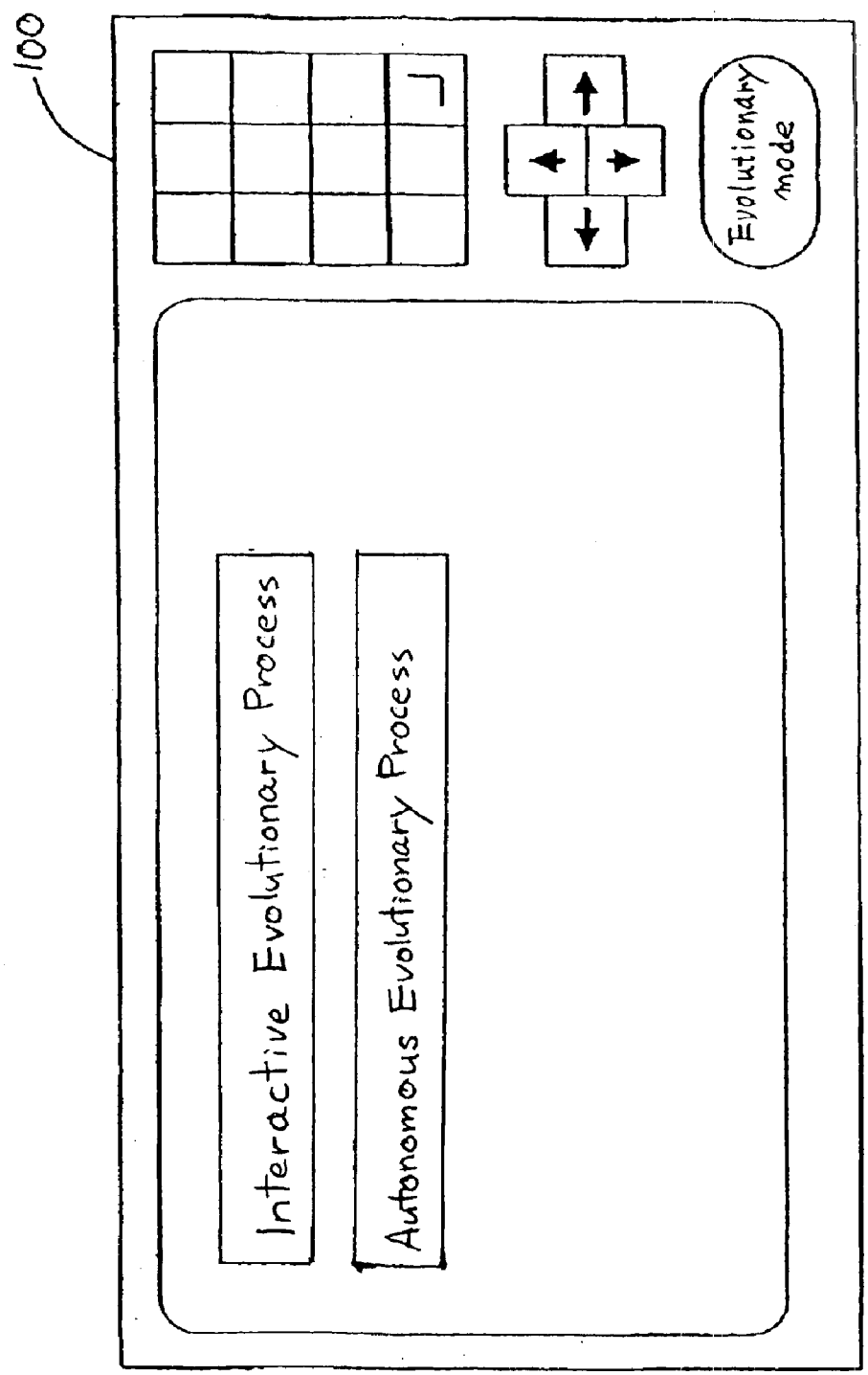
FIG. 10 illustrates one example of an interface for switching between regular control mode and evolutionary mode.

FIG. 10 illustrates one example of an interface for switching between regular control mode and evolutionary mode. As shown in FIG. 8, the interactive evolutionary process unit has two modes: a regular control mode and an evolutionary mode. The switching (step 2-1) between the regular control mode and the evolutionary mode is made in accordance with the conditions fixed beforehand, for example, time or user's intention through an interface shown in FIG. 10.

FIG. 11 illustrates one example of seeking a total of fitness of fuzzy rules. The regular control mode performs fuzzy control using a fuzzy rule table established at the time, and at the same time seeks a total of fitness of the fuzzy rules till evolutionary mode is switched on (step 2-2). To be specific, as shown in FIG. 11, calculation results of the fitness table for calculating the fitness of each fuzzy rule at a certain time are added to the total table for calculating a total of fitness till the evolutionary mode is switched on (step 2-3). The regular control mode is terminated at the time the evolutionary mode is switched to.

When the evolutionary mode is switched to, as shown in FIG. 8, referring to the total table, an arbitrary number of fuzzy rules are encoded into chromosomes in the order of higher total (step 2-4). Regarding these as initials, perturbation is added following a normal distribution to produce a first generation comprising a plurality of initial individuals (step 2-5). A trial ride is made using parameters for any individual in the first generation (step 2-6). The user inputs an evaluation value for the individual (step 2-7).

Based on the evaluation value, it is decided whether a desired boat operation characteristic is obtained (step 2-8). If it is, the individual is regarded as best and the evolutionary process is terminated. If it is not, it is decided whether a trial ride and an evaluation about all the individuals in the first generation are finished (step 2-9). If the trial ride and the evaluation about all the individuals are not finished, the fuzzy rules of the fuzzy control module are changed to those of other individuals (step 2-10) and a ride is tried once again (step 2-6). If they are, it is judged whether a stipulated generation is reached (step 2-11). If it is judged so, the individual with the highest evaluation value in the generation is considered to be best and the evolutionary process is ended. If it is not judged so, the evolutionary calculation module begins (step 2-12) to produce individuals to the next generation and make a trial ride and an evaluation using the fuzzy rules for the individuals.

If the desired boat operation characteristics are not obtained, the above process is repeated till the number of stipulated generations is reached. As a result, a part of the fuzzy rule table for the boat operation fuzzy control module is replaced by the fuzzy rules for the individuals obtained, and the total table used in step 2-3 is initialized to zero (step 2-13).

Then, when the regular control mode is switched on again, the fuzzy control is performed by using the replaced fuzzy rule table, and a total of fitness for each fuzzy rule at this time is sought till the evolutionary mode is switched on.

Repeating the above process enables the fuzzy rules with a higher total of fitness, i.e., the fuzzy rules in the region frequently used in the present environment, to be optimized in concentration. Since a fuzzy rule in the region not frequently used does not need to be changed, stable control can be achieved even when the environment changes suddenly and fuzzy rules in the region not frequently used are used.

2. Control in Acceleration Optimization Control Section

The trim control module outputs a trim variable with respect to speed as shown in FIG. 5.

Figures 12, 13:
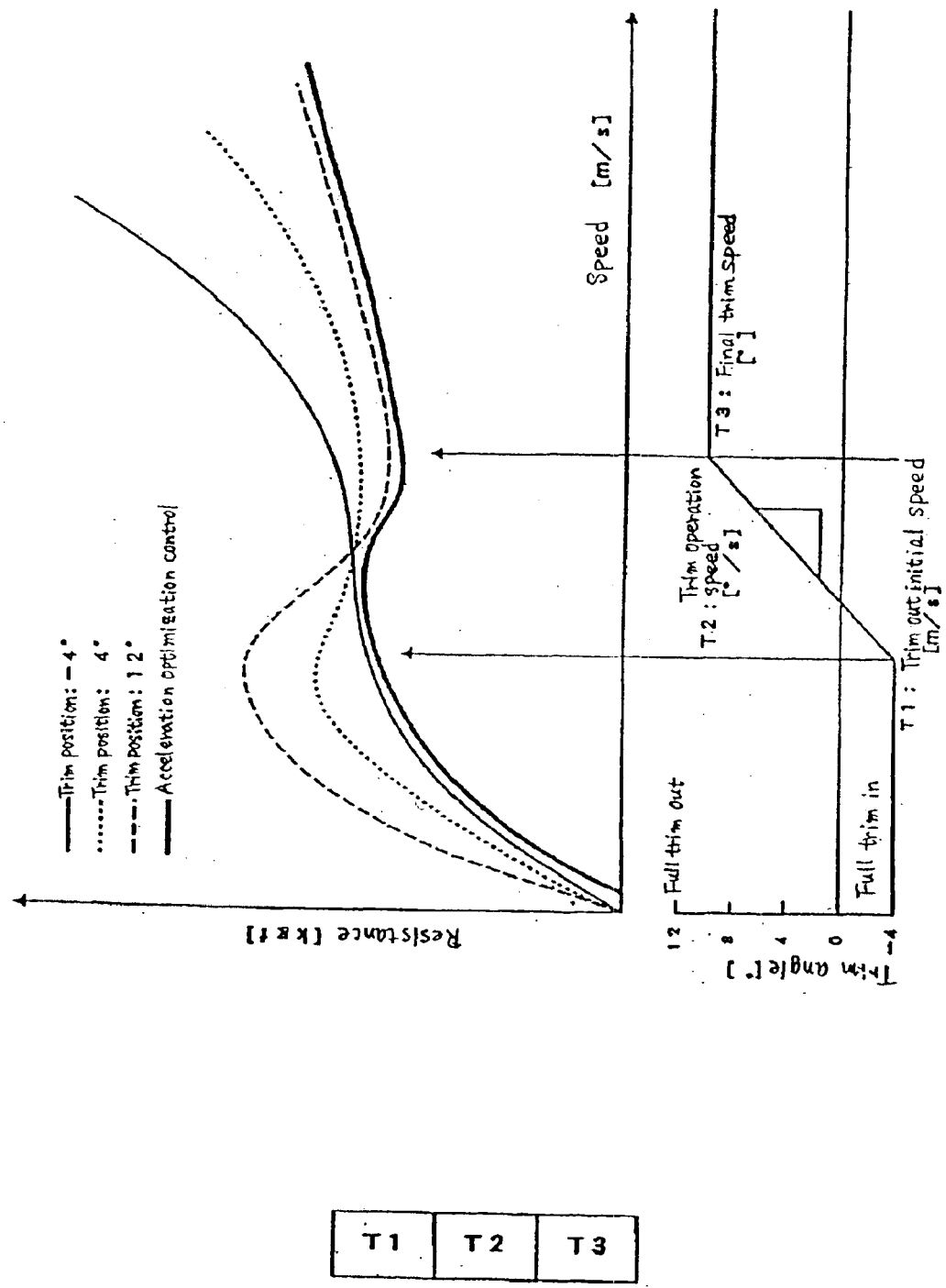
FIG. 12 is a graph showing the relationship between boat speed-resistance curve and trim positions.
FIG. 13 shows one example of individuals used in an autonomous evolutionary process unit in an acceleration optimization control section.

FIG. 12 is a graph showing the relationship between boat speed-resistance curves and trim positions. As shown in the figure, the boat speed-resistance curve depends heavily on the trim positions. The resistance produced between water surface and a hull may be categorized into wave making resistance and friction resistance. The wave making resistance is the one derived from waves generated by a boat itself when the boat moves forward. The friction resistance is the one derived from friction between a hull and water surface.

In a low speed region, the wave making resistance increases in accordance with a higher speed, and at a certain speed, reaches a limit, whose condition is called bump. The bump is smallest when the trim angle is at full trim in where the trim angle is smallest, and becomes bigger as the trim angle gets closer to full trim out where the trim angle is largest.

Beyond the bump, the wave making resistance gradually becomes smaller to a planing state. The friction resistance at the time of the planing is largest at full trim in and is smallest near full trim out.

In accelerating manually from the state of stop to the highest speed, a throttle is fully opened from the state of the full trim in, and after the hump, the trim is gradually operated outward till the trim angle where pitching and Dutch roll are not produced. By doing this, the wave making and friction resistances can be suppressed. As a result, time from stop of a boat to the highest speed is shortened. However, timing for operating a trim, an operating speed and a final trim angle vary greatly depending on kinds of hulls and disturbances, and requires an advanced operation technique.

FIG. 13 shows one example of individuals used in an autonomous evolutionary process unit in an acceleration optimization control section. In the figure, control parameters for a trim control module-trim out initial speed T1, trim operation speed T2, and final trim angle T3 -are shown. The autonomous evolutionary process unit employs a genetic algorithm. The control parameters are encoded to produce individuals and are optimized using the genetic algorithm. Evaluation of each individual during the autonomous evolutionary process is conducted by an evaluation unit, where an evaluation value is higher as a desired acceleration characteristic, for example, time from stop of a boat to a predetermined speed becomes shorter. Accordingly, the control parameters of the trim control module are automatically optimized to the desired acceleration characteristic (the bold line in FIG. 12). Even when a use environment or a hull changes, an optimum acceleration characteristic can be obtained.

The interactive evolutionary process unit in the acceleration optimization control section employs a genetic algorithm. Control parameters for a trim control module are coded to produce individuals and are optimized using the genetic algorithm. Evaluation of each individual during interactive optimization process is conducted based on comfortableness a user really feels. As a result, the control parameters are optimized in accordance with the user's evaluation and an optimum acceleration characteristic that meets user's evaluation can be obtained.

Switching over between the autonomous evolutionary process unit and the interactive evolutionary process unit (step I in FIG. 8) can be based on time or user's intention through an interface 100 shown in FIG. 10. To be specific, The autonomous evolutionary process unit performs evolutionary process where an optimum acceleration characteristic is produced. Based on the optimum acceleration characteristic, the interactive evolutionary process unit conducts interactive evolutionary process and a fine adjustment may be made to meet a user's preference. When an individual a user does not like is produced during the autonomous evolutionary process, the user may give a zero evaluation value at the scene to change to the next individual.

Next, the evolutionary process in the acceleration optimization control section will be explained.

Figure 14:
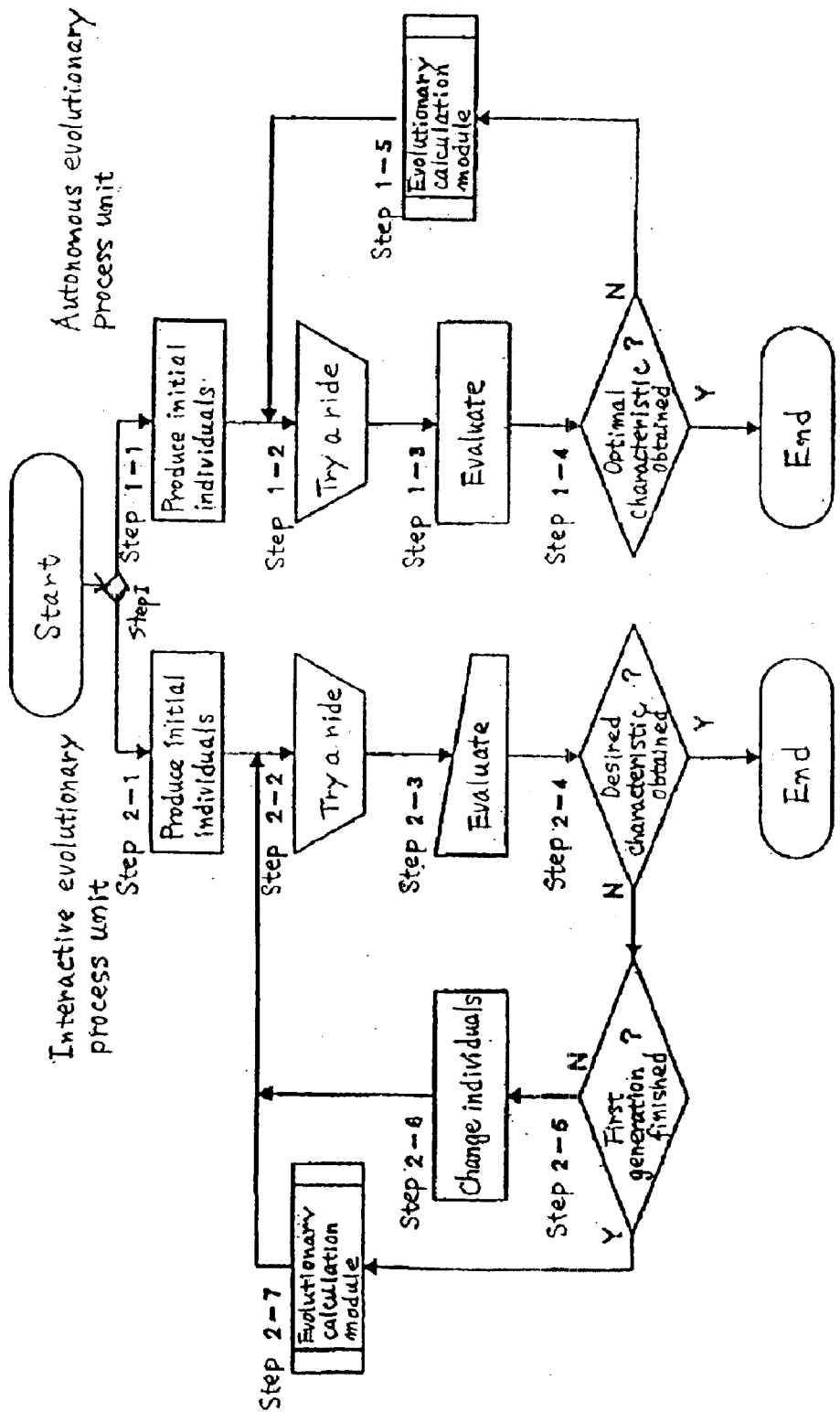
FIG. 14 is a flowchart illustrating evolutionary flow in an acceleration optimization control section.

FIG. 14 is a flowchart illustrating evolutionary flow in an acceleration optimization control section.

a. Evolutionary Process in an Autonomous Evolutionary Process Unit

As shown in FIG. 14, initial values of the control parameters are first decided at random within a predetermined range to produce a first generation from a plurality of initial individuals (step 1-1). Acceleration optimization control evaluation is made on all the individuals in the first generation (step 1-2). The Acceleration optimization control evaluation is explained briefly here. A throttle is accelerated fully open, one time per one individual, from stop of a boat to a predetermined speed. Time needed to reach the predetermined speed is calculated as an evaluation value.

Based on the evaluation value for each individual derived from the evaluation value calculation process (step 1-2), it is evaluated whether it is an optimal acceleration characteristic (step 1-3). As a result of the evaluation, it is determined whether an optimal acceleration characteristic is obtained (step 1-4). If an optimal boat operation characteristic is obtained, the evolutionary process is finished. If not, an evolutionary calculation module begins to produce a next generation of individuals (step 1-5).

b. Evolutionary Process in an Interactive Evolutionary Process Unit

As shown in FIG. 14, initial values of the control parameters are first decided at random within a predetermined range to produce a first generation from a plurality of initial individuals (step 2-1). A trial ride is made by using parameters for any one of individual parameters in a first generation (step 2-2). A user inputs evaluation values on the individual (step 2-3). Based on the evaluation values, it is decided whether a desired acceleration characteristic is obtained (step 2-4). If it is, the evolutionary process is finished. If it is not, it is decided whether a trial ride and evaluation on all the individuals of one generation are over (step 2-5). If it is not, the parameters for the trim control module are changed to those for another individual (step 2-6), and another trial ride is done (step 2-2). If, on the contrary, it is, the evolutionary calculation module begins (step 2-7) to produce an individual group of the next generation. Once again, another trial ride and evaluation using parameters of the individuals are conducted.

The process is repeated till a desired acceleration characteristic is obtained, and as a result the parameters of the trim control module are optimized.

An evaluation of acceleration characteristics, which uses an interactive type, is explained here. After acceleration is increased from a stop of a boat to a predetermined speed with a throttle fully open, one time per individual, an evaluation value is input based on the acceleration and comfortableness a user feels.

Now, some of evolutionary computation modules will be exemplified.

a. Genetic Algorithm (GA)

Figure 15:
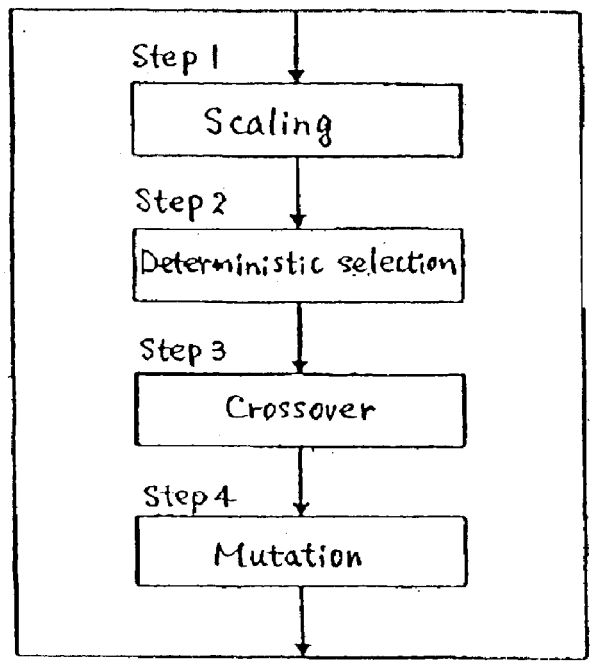
FIG. 15 is a flowchart illustrating an evolutionary computation module when generic algorithm is used as an evolutionary computation method.

FIG. 15 is a flowchart illustrating an evolutionary computation module when a generic algorithm is used as an evolutionary computation method. In the module, when a desired characteristic is not obtained after completion of an evaluation of all the individuals to one generation, a group of individuals to the next generation is produced.

With respect to scaling (step 1), a linear transformation of fitness is performed so that the ratio of an average fitness to a maximum fitness in a individual group may be constant.

As for selection (step 2), a roulette selection system can be adopted that selects stochastically in proportional to user's evaluation (fitness). A tournament selection system can also be employed that selects one with the best evaluation in the N individuals selected at random.

Regarding crossover (step 3), there are methods such as one-point crossover, two-point crossover, and normal-distribution crossover. It happens that a selected parent for crossover is the same individual. When this situation is left as is, diversity as an individual group is lost. Therefore, if a parent selected for crossover is the same individual, the crossover for the same individual should be avoided as much as possible by replacing the individual with another selected individual.

As for mutation (step 4), values are changed at random with a constant probability about each locus for individuals. There is also another method by which perturbation having a normal distribution can be added. In the case where different individuals are selected as parents for crossover and the different individuals are genetically the same, mutation takes place with higher probability than usual for both of the parents to be crossed over.

In addition to that mentioned above, a method of the alternation of generations called "regeneration," which replaces all the individuals to one generation one time, may be employed.

When the alternation of generations is applied strictly, there is a possibility that an individual with high evaluation may be destroyed. Accordingly, elite preservation strategy can be used together that unconditionally leaves the elite (any number of individuals that have acquired high evaluation) to the next generation.

b. Evolutionary Strategy (ES)

Figure 16:
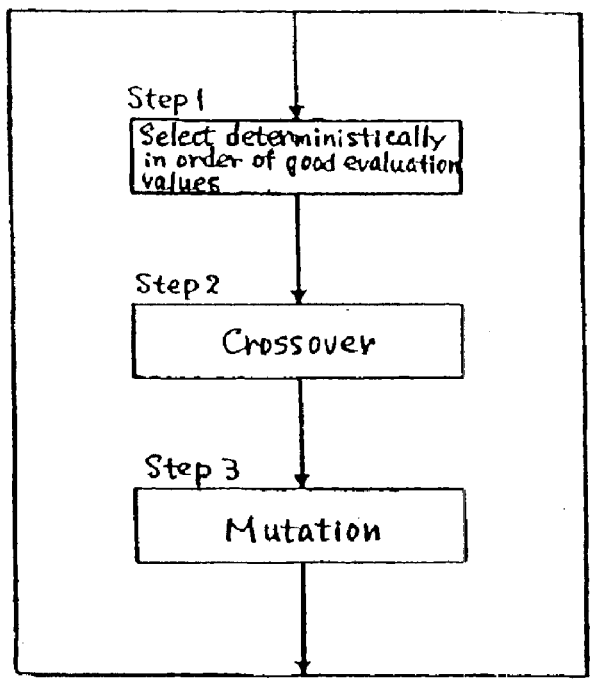
FIG. 16 is a flowchart illustrating an evolutionary computation module when evolutionary strategy is used as an evolutionary computation method.

FIG. 16 is a flowchart illustrating an evolutionary computation module when evolutionary strategy is used as an evolutionary computation method. The module produces an individual group for the next generation, after completing an evaluation of all the individuals to one generation, when a desired characteristic is not obtained.

As for selection (step 1), two exemplary kinds of methods are explained since methods of selection are different owing to the kinds of evolutionary strategy. $(\mu, \lambda)$-ES: This evolutionary strategy deterministically selects $\mu$ individuals in the order of better fitness from $\lambda$ child individuals produced by $\mu$ parent individuals. $(\mu+\lambda)$-ES: This evolutionary strategy deterministically selects $\mu$ individuals in the order of better fitness from $\mu$ parent individuals and $\lambda$ child individuals combined.

In addition to the methods mentioned above, the evolutionary strategy includes other methods below. When these methods are used, a selection suitable for the methods should be made.

(1, 1)-ES: Random Walk (RW)
(1+1)-ES: Hill Climbing (HC)
(1, λ)-ES, (1+λ)-ES: Adjacent search method
(μ+1)-ES: Successive generation multi-point search method Regarding crossover (step 2), the normal distribution is used. Parents' values can be succeeded for each parameter, and child's values can be a middle point, interpolated point or extrapolated point.

With respect to mutation (step 3), perturbation having a normal distribution is added to each parameter. The dispersion of the normal distribution may be adjusted every parameter or may have interrelationship between the parameters.

Since the evolutionary strategy (ES), as explained above, uses each parameter as a real number, it has the advantage that a transformation from phenotype to genotype is no longer necessary. Using a method of crossover having continuity of real numbers such as normal distribution crossover enables parents' character to be reflected more heavily to child's character than the binary code frequently used in a genetic algorithm or the gray code crossed over at one point or many points.

c. Evolutionary Programming (EP)

Figure 17:
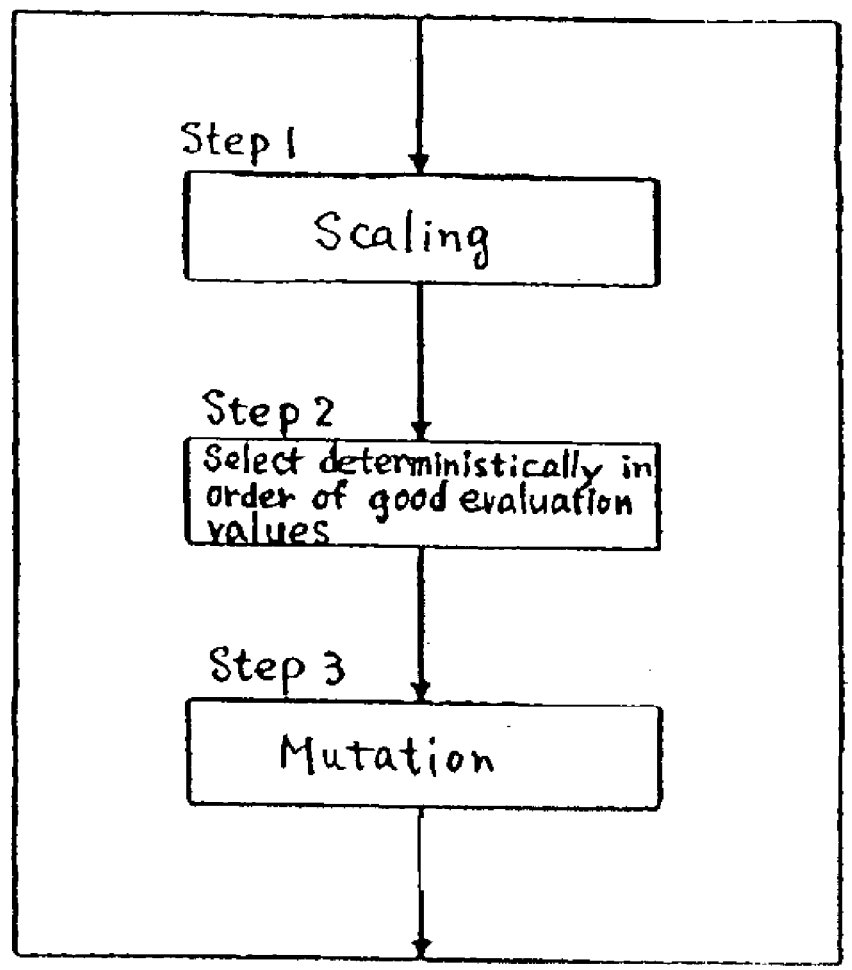
FIG. 17 is a flowchart illustrating an evolutionary computation module when evolutionary programming is used as an evolutionary computation method.

FIG. 17 is a flowchart illustrating an evolutionary computation module when evolutionary programming is used as an evolutionary computation method.

With regard to scaling (step 1), when the number of individuals is μ, the 2μ individuals, combined with the individuals before perturbation is added and the individuals after perturbation is added, are compared with the q individuals selected at random. The superior number is defined as fitness of the individuals.

In selection (step 2), μ individuals are selected in the order of good fitness from individual groups produced. The selection is deterministic, but since scaling is stochastic, the selection is substantially stochastic.

Since the evolutionary programming (EP) mentioned above uses each parameter as a real number, it has the advantage that a transformation from phenotype to genotype is no longer necessary. As no crossover is used, there is no limitation in phenotype. The parameters of the genetic algorithm do not have to be in a string as in the evolutionary strategy, and may be in a tree structure.

The use environment of the planing boat in the embodiments can be varied remarkably owing to the change of weathers or seasons. The preference of users varies significantly. Therefore, it is impossible to acquire boat speed control characteristics that can satisfy all users under every use environment, in a design stage or setting stage before shipment. Since an outboard motor and a hull are manufactured individually, throttle control and trim angle control for the hull are indispensable so as to achieve optimal boat speed control, in addition to the characteristics of use environment and a user. When a fuzzy controller is used as a control device, it is difficult to optimize the characteristics of the fuzzy controller to fit all conditions. However, as described above, the parameters for the boat operation fuzzy control module, which controls an electronic throttle valve and a trim, may be optimized in real time by using the evolutionary calculation. Accordingly, the invention has the distinct advantage that the boat control can be achieved that suits all conditions.

In the embodiments explained above, information concerning engine speed, speed, acceleration, and steering angle is input. Based on the information, by operating an electronic throttle valve and a trim apparatus, intake of air and posture of a hull are controlled to realize constant speed navigation control. The constant speed navigation control unit determines, based on the predetermined input information, an opening of the electronic throttle valve and a trim angle through a boat operation fuzzy control module. The standardized coefficients for the boat operation fuzzy control module are optimized using an autonomous evaluation, and the fuzzy rules for the boat operation fuzzy control module are optimized using an interactive evaluation. By inputting the speed and operating the trim apparatus based on the input information, the posture is controlled that leads to the acceleration control. The acceleration optimization control unit determines the trim angle based on the predetermined input information through the trim control module. The control parameters for the trim control module are optimized using the autonomous and interactive evaluations. These are applied to the navigation control apparatus. The navigation control apparatus in accordance with the invention is not limited to the embodiments mentioned above. For example, the evaluation may be made based on fuel consumption rate and/or power rate, or based on comfortableness a user feels. The acceleration optimization control section may include an electronic throttle control module.

In the embodiments above, an outboard motor for a planing boat and a trim apparatus are optimized. The invention is not restricted to the embodiments.

Figure 18:
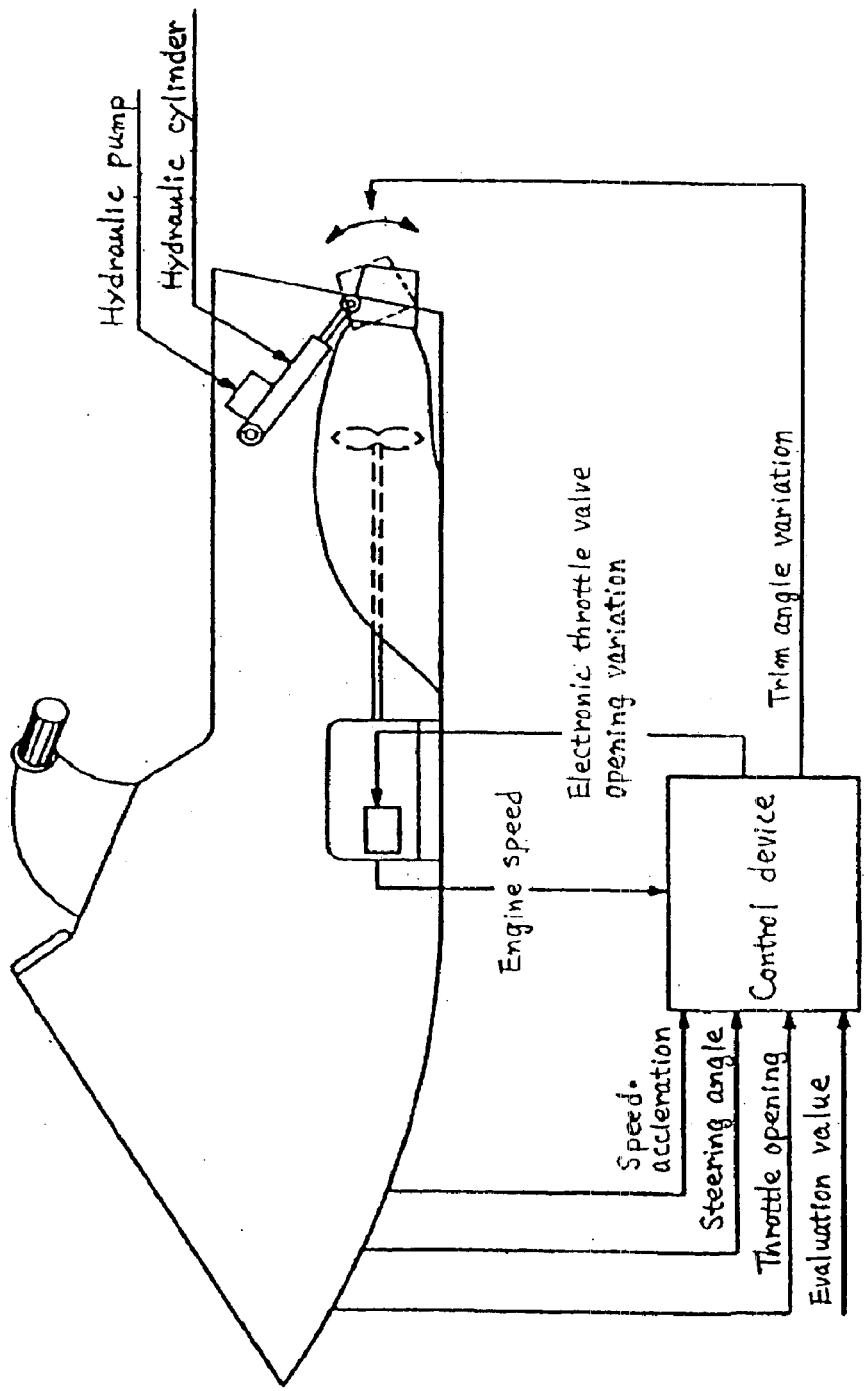
FIG. 18 is another embodiment of the invention.

FIG. 18 is another embodiment of the invention. As shown in the figure, a personal watercraft is used as a complete product that comprises an engine, a water nozzle apparatus, and a hull. The engine and water nozzle apparatus constitute a unitary apparatus. When the invention is applied, a control device that controls an electronic throttle and a water nozzle trim apparatus in the engine are optimized with the characteristics of the personal water craft as an evaluation criterion. The control of the intake of air and the posture of the hull can be optimized.

Figure 19:
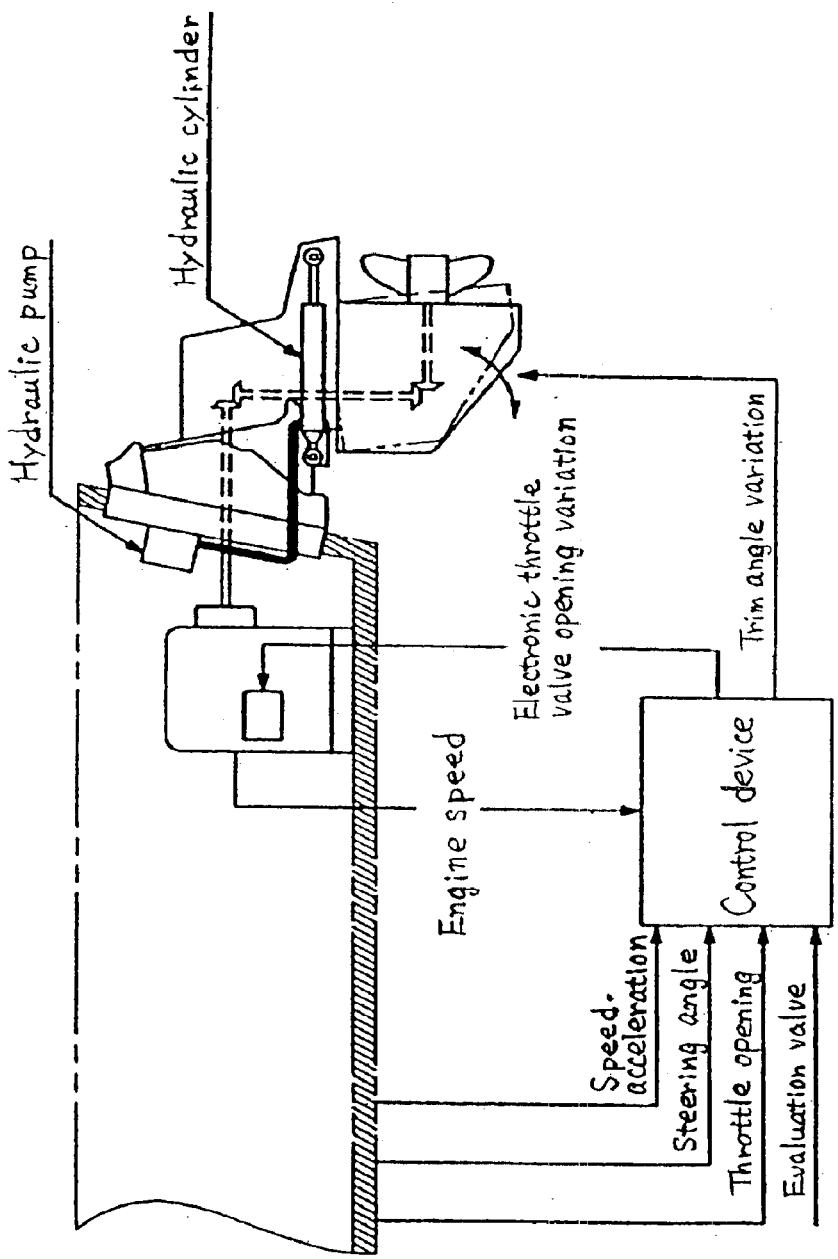
FIG. 19 is a further embodiment of the invention.

FIG. 19 is a further embodiment of the invention. The planing boat is used as a combined apparatus that comprises a hull, an outboard motor and a trim apparatus having a gasoline engine. When the invention is applied with the outboard motor and trim apparatus as a unitary apparatus, the control device that controls an electronic throttle valve apparatus and a trim apparatus in the engine can be optimized with the characteristics of the planing boat as an evaluation criterion. Then control of intake of air and a posture of a hull can also be optimized.

Figure 20:
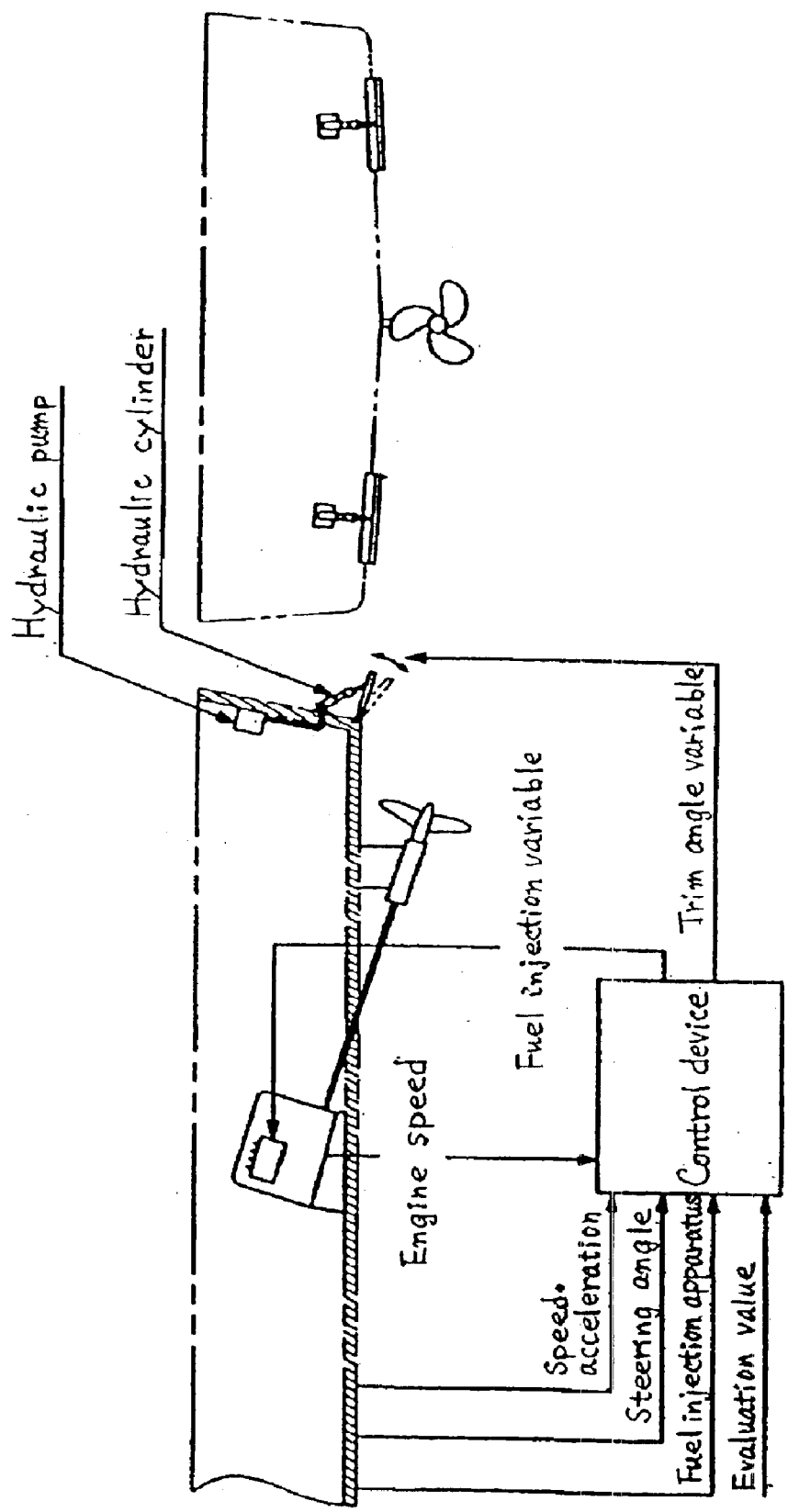
FIG. 20 is a still further embodiment of the invention.

FIG. 20 is a still further application of the invention. The planing boat is used as a combined apparatus that comprises a hull, an outboard motor having a diesel engine and a flap movable apparatus. When the invention is provided by treating the outboard motor and flap movable apparatus as a unitary apparatus, the control device, which controls a fuel injection apparatus in the engine and the flap movable apparatus, are optimized with the characteristics of the planing boat a evaluation criterion. Then the control of quantity of fuel injection and a posture of the hull can be optimized.

Figure 22:
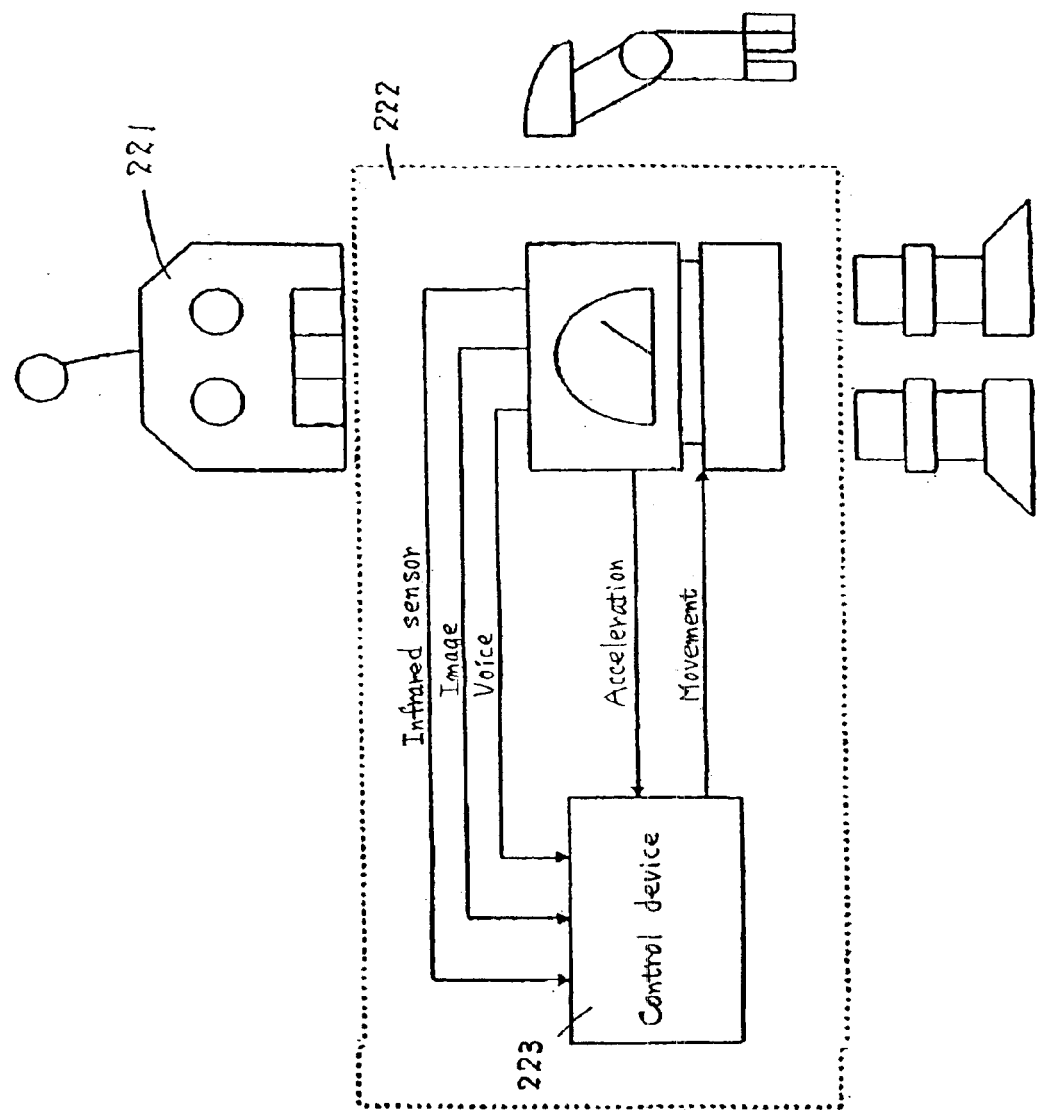
FIG. 22 is still another embodiment in accordance with the invention.
Figure 23:
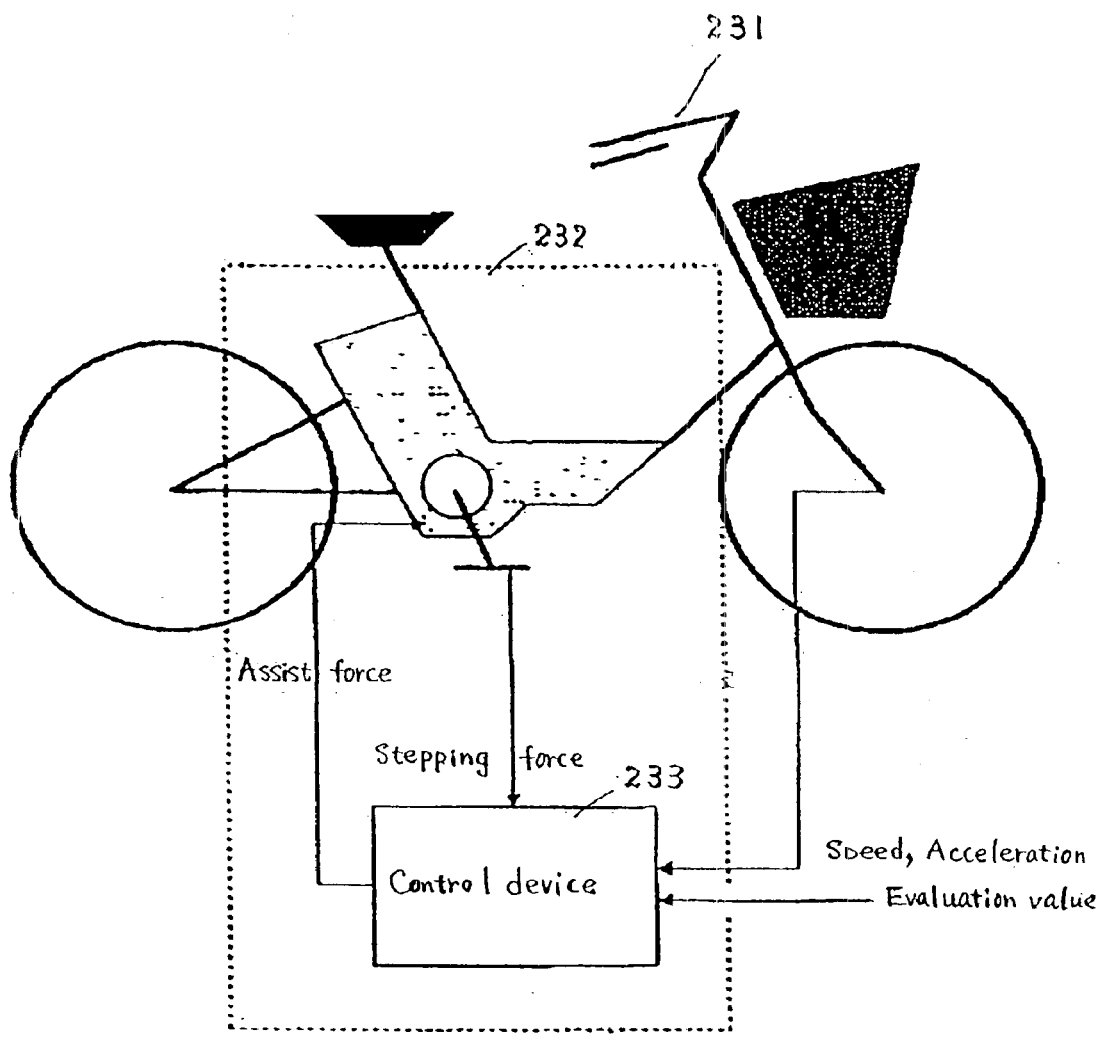
FIG. 23 is still another embodiment in accordance with the invention.

The controlled system to which the optimization apparatus of the invention applies is not limited to the embodiment described above. Instead, the controlled system may be any control device so long as the control device controls an operation characteristic of unitary apparatuses that are used as a combined apparatus by combining other apparatuses. For example, the controlled systems shown in FIGS. 21–23 are candidates.

Figure 21:
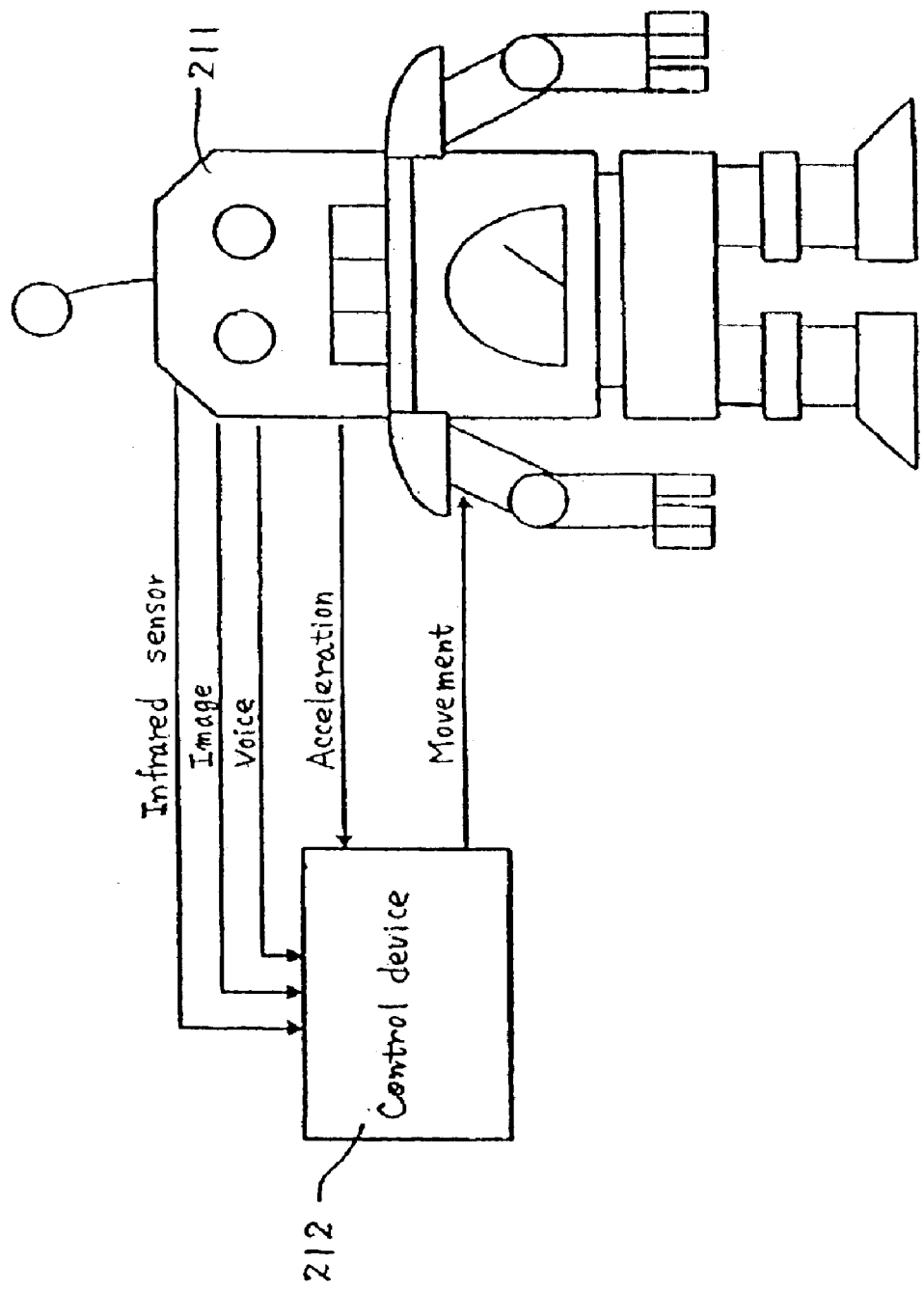
FIG. 21 is another embodiment in accordance with the invention.

FIG. 21 shows an embodiment where the optimization method in accordance with the invention is applied to a control device that controls the movement of a robot. In the embodiment, the control device 212 inputs information from an infrared sensor attached to the robot 211, an image input device such as a camera, a voice input device such as a microphone, and an accelerator sensor. The control device 212 includes a fuzzy control module (not shown) which outputs information on the movement for the robot 211. The fuzzy control module can be optimized in real time.

The parameters to be optimized may selected arbitrarily. Evaluation for optimization is made directly by a user through an appropriate input device. The input device to which the user will apply evaluation can be provided separately. For example, the input device may be constructed to detect the state of the user by the image input device and the voice image input device, and based on the detection results, to recognize the evaluation of the user. The construction brings about the advantage that the robot's movement can be optimized as if the robot understood the user's intention.

In this way, when the optimization method according to the invention is applied to the control device that controls the movement of the robot, the robot can execute optimal movements, according to a change of robot's bodies (for example, a change from a human-type robot to a dog-type robot), a change of use environments, and user's preference.

FIG. 22 shows an embodiment where a head, arms, and/or legs of a robot 221 may be interchangeably mounted to a body thereof. The body 222 of the robot 221 contains a control device 223 that controls the movement of each part. When the optimization method in accordance with the invention is applied to the control device 223, even if the head, arms, and/or legs are interchanged, the control device 223 can be optimized so that an optimal movement may be made according to a specified part mounted. Accordingly, since the limitations to the parts of the robot 221 are reduced, interchange of the parts can be easily made. Thus, the advantages are provided that the robot 221 itself can perform various types of jobs or entertainment movements only by interchanging the parts, which increases availability of the robot 221.

FIG. 23 shows an embodiment where the optimization method in accordance with the invention is applied to a control device 233 of a bicycle 231 with an electrically driven auxiliary power unit 232. The control device 233, including a fuzzy control module, receives a stepping force for a pedal from a user, a speed, an acceleration, and an evaluation value, and outputs an assist force to the electrically-driven auxiliary power unit 232, decided by the fuzzy control module. The fuzzy control module is optimized in real time.

The optimization method in accordance with the invention is applied to the control device 233 of the bicycle 231 with the electrically driven auxiliary power unit 232. Even if the bicycle 231 may be interchanged to a new bicycle to which the control device 233 is attached, the assist force can be optimized in real time for the new bicycle. This reduces the limitations to the kinds of bicycle. Even when a bicycle and an electrically driven auxiliary power unit are manufactured independently, the electrically driven auxiliary power unit can easily be adapted to each of the bicycles. The advantage is provided that in accordance with the preference to use environment, age or physique of a user, an assist force, or duration of a battery, a control device is optimized in real time so that an optimal assist force may be generated. As far as an apparatus has an electrically driven auxiliary power unit, the same effect can be obtained from any apparatus, for example, a wheelchair.

In the control device for controlling an operation characteristic of the unitary apparatus that is used as a combined apparatus by combining other apparatuses, the optimization process unit is provided for, in real time, optimizing an operation characteristic of the unitary apparatus, with the functional characteristics of the combined apparatus as an evaluation criterion. Accordingly, the invention produces an advantage that without losing user's selectivity and versatility of the unitary apparatus, optimum characteristics as the combined apparatus can be obtained.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A method for optimizing operation of a machine assembly while being manipulated by a user, said machine assembly comprising plural replaceable devices, each device being operated by a control module, the input-output relationship of which control module is regulated by control parameters, said method comprising the steps of:

(a) operating the machine using control modules;

(b) during step (a), optimizing the input-output relationship of at least a single control module outputting at least a single variable, by coding into templates parameters fully or partially regulating said single control module, said templates of said single control module being subjected to heuristic processing, wherein the single control module uses fuzzy rules, and the control parameters include parameters defining the fuzzy rules and parameters defining coefficients of input and output of the single control module, wherein the parameters defining the fuzzy rules are evaluated based on (i) the user's ultimate choice during the operation, and the parameters defining the coefficients of input and output of the single control module are evaluated based on (ii) a preselected target used separately, to obtain at least one fitted set of parameters at each evaluation for said single control module, the parameters of which are optimized to optimally output the single variable based on both of the evaluations; and (c) operating the machine assembly using the optimized control module.

2. The method according to claim 1, wherein the control module comprises a main control module and an auxiliary control module for adjusting output of the main control module, and step (b) is conducted on the auxiliary control module.

3. The method according to claim 2, wherein the main control module and the auxiliary control module are arranged in series.

4. The method according to claim 2, wherein the main control module and the auxiliary control module are arranged in parallel.

5. The method according to claim 1, wherein the control module comprises a central control module and multiple local control modules each receiving signals from the central control module and outputting signals to the respective replaceable devices, and step (b) is conducted on the central control module.

6. The method according to claim 1, wherein the heuristic processing is evolutionary computation, and the templates are chromosomes.

7. The method according to claim 1, wherein the machine assembly is a watercraft.

8. The method according to claim 7, wherein the replaceable devices include a trim apparatus and an electronic throttle.

9. The method according to claim 1, wherein the evaluation of output of the machine assembly by the user's ultimate choice and that by the preselected target are switched based on time or the user's choice.

10. An optimization apparatus for optimizing an operation characteristic of a unitary apparatus that can be used as a combined apparatus by combining other apparatuses used by a user, the optimization apparatus comprising:
   an optimization process device for optimizing the operation characteristic of the unitary apparatus, with a functional characteristic of the combined apparatus as an evaluation criterion, said optimization process device comprising:
   (i) at least a single control module regulated by control parameters for controlling operation of the unitary apparatus, said single control module outputting at least a single variable;
   (ii) an autonomous evolutionary process unit for optimizing the operation of said single control module by selecting a portion of the control parameters based on a predetermined evaluation criterion;
   (iii) an autonomous evaluation unit for evaluating the operation of the unitary apparatus and providing the evaluation to the autonomous evolutionary process unit;
   (iv) an interactive evolutionary process unit for optimizing the operation of said single control module by selecting another portion of the control parameters based on the user's choice during the operation of the unitary apparatus; and
   (v) an evaluation input unit for inputting by the user an evaluation of the operation of the unitary apparatus to the interactive evolutionary process unit,
   wherein the parameters of the control module are optimized to optimally output the single variable based on both of the evaluations by the autonomous evolutionary process unit and the interactive evolutionary process unit.

11. The optimization apparatus of claim 10, wherein the control module is used as an auxiliary control module, and the optimization apparatus further comprises a basic control module for deciding a manipulated variable of the unitary apparatus, said auxiliary control module being arranged and connected in parallel to or in a series with the basic control module.

12. The optimization apparatus of claim 10, wherein the optimization operation unit carries out operation with regard to optimization using heuristics.

13. The optimization apparatus of claim 12, wherein the heuristics is an evolutionary calculation method.

14. The optimization apparatus of claim 10, wherein the unitary apparatus is a power generator for a combined apparatus, and the other apparatuses are a body of the combined apparatus.

15. The optimization apparatus of claim 10, wherein the unitary apparatus is an outboard motor and the other apparatuses are a hull.

16. The optimization apparatus of claim 10, wherein the unitary apparatus is an electrically-driven auxiliary power device and the other apparatuses are a bicycle or wheelchair.

17. The optimization apparatus of claim 10, wherein the unitary apparatus is an electronically-controlled fuel injection device of a motor and the other apparatuses are an electronic throttle device of the motor.

18. The optimization apparatus of claim 11, wherein the unitary apparatus is an electronic throttle device of a motor and the other apparatuses are an electronically-controlled fuel injection device of the motor.

19. The optimization apparatus of claim 11, wherein the unitary apparatus is a body of a robot and the other apparatuses are a head, arms and for legs of the robot.

20. The optimization apparatus of claim 11, wherein the unitary apparatus is an indoor machine of an air conditioner and the other apparatuses are an outdoor machine of the air conditioner.

21. The optimization apparatus of claim 11, wherein the unitary apparatus is an outdoor machine of an air conditioner and the other apparatuses are an indoor machine of the air conditioner.

22. An optimization apparatus for optimizing an operation characteristic of a unitary apparatus that can be used as a combined apparatus by combining other apparatuses used by a user, the optimization apparatus comprising:
   an optimization process device for optimizing the operation characteristic of the unitary apparatus, with a functional characteristic of the combined apparatus as an evaluation criterion, said optimization process device comprising:
   (i) at least a single control module regulated by control parameters for controlling operation of the unitary apparatus, said single control module using fuzzy rules and outputting at least a single variable, said control parameters including parameters defining the fuzzy rules and parameters defining coefficients of input and output of the single control module;
   (ii) an autonomous evolutionary process unit for optimizing the parameters defining coefficients of input and output of the single control module based on evaluation by an autonomous evaluation unit;
   (iii) the autonomous evaluation unit for evaluating the operation of the unitary apparatus and providing the evaluation to the autonomous evolutionary process unit;
   (iv) an interactive evolutionary process unit for optimizing the parameters defining the fuzzy rules based on evaluation by an evaluation input unit; and
   (v) the evaluation input unit for inputting by the user an evaluation of the operation of the unitary apparatus to the interactive evolutionary process unit,
   wherein the parameters of the control module are optimized to optimally output the single variable based on both of the evaluations by the autonomous evolutionary process unit and the interactive evolutionary process unit.

* * * * *

UNITED STATES PATENT AND TRADEMARK OFFICE
CERTIFICATE OF CORRECTION

PATENT NO. : 6,895,286 B2  
APPLICATION NO. : 09/727424  
DATED : May 17, 2005  
INVENTOR(S) : Hirotaka Kaji et al.

It is certified that error appears in the above-identified patent and that said Letters Patent is hereby corrected as shown below:

Column 18, Line 8, in claim 18, delete "claim11" and insert -- claim 10 --, therefor.  
Column 18, Line 12, in claim 19, delete "claim 11" and insert -- claim 10 --, therefor.  
Column 18, Line 14, in claim 19, delete "for" and insert -- / or --, therefor.  
Column 18, Line 15, in claim 20, delete "claim 11" and insert -- claim 10--, therefor.  
Column 18, Line 18, in claim 21, delete "claim 11" and insert -- claim 10--, therefor.

Signed and Sealed this

Twenty-first Day of November, 2006

JON W. DUDAS  
*Director of the United States Patent and Trademark Office*